(12) United States Patent
Fukuda et al.

(10) Patent No.: US 7,200,287 B2
(45) Date of Patent: Apr. 3, 2007

(54) METHOD AND APPARATUS FOR IMAGE PROCESSING, AND A COMPUTER PRODUCT

(75) Inventors: Hiroaki Fukuda, Kanagawa (JP); Yoshiyuki Namizuka, Kanagawa (JP); Hideto Miyazaki, Kanagawa (JP); Shinya Miyazaki, Tokyo (JP); Yasuyuki Nomizu, Kanagawa (JP); Sugitaka Oteki, Tokyo (JP); Takako Satoh, Kanagawa (JP); Takeharu Tone, Tokyo (JP); Fumio Yoshizawa, Kanagawa (JP); Yuji Takahashi, Kanagawa (JP); Hiroyuki Kawamoto, Kanagawa (JP); Rie Ishii, Tokyo (JP)

(73) Assignee: Ricoh Company, Ltd, Tokyo (JP)

( * ) Notice: Subject to any disclaimer, the term of this patent is extended or adjusted under 35 U.S.C. 154(b) by 409 days.

(21) Appl. No.: 09/749,819

(22) Filed: Dec. 28, 2000

(65) Prior Publication Data

US 2001/0021278 A1    Sep. 13, 2001

(30) Foreign Application Priority Data

Dec. 28, 1999  (JP)  ................................ 11-375563

(51) Int. Cl.
*C06K 9/54*   (2006.01)
*C06K 9/60*   (2006.01)
*C06F 15/16*  (2006.01)
*C09G 5/39*   (2006.01)

(52) U.S. Cl. ...................... 382/304; 382/307; 345/502; 345/532

(58) Field of Classification Search ................ 382/307, 382/304; 345/502, 506, 505, 530, 531, 532, 345/535, 536, 418, 559; 712/20, 22
See application file for complete search history.

(56) References Cited

U.S. PATENT DOCUMENTS

| | | | | |
|---|---|---|---|---|
| 4,841,435 A | * | 6/1989 | Papenberg | 710/53 |
| 5,050,221 A | | 9/1991 | Ohta et al. | |
| 5,151,881 A | * | 9/1992 | Kajigaya et al. | 365/233 |
| 5,355,508 A | * | 10/1994 | Kan | 712/20 |
| 5,410,619 A | | 4/1995 | Fujisawa et al. | |
| 5,457,779 A | * | 10/1995 | Harrell | 345/502 |
| 5,729,503 A | * | 3/1998 | Manning | 365/233.5 |

(Continued)

FOREIGN PATENT DOCUMENTS

JP            7-210545         8/1995

(Continued)

OTHER PUBLICATIONS

U.S. Appl. No. 09/749,819, filed Dec. 28, 2000, Fukuda et al.
U.S. Appl. No. 10/805,184, filed Mar. 22, 2004, Namizuka.

*Primary Examiner*—Bhavesh M Mehta
*Assistant Examiner*—Wes Tucker
(74) *Attorney, Agent, or Firm*—Oblon, Spivak, McClelland, Maier & Neustadt, P.C.

(57) ABSTRACT

The image processing apparatus is provided with a plural memory controllers, each of which controls a RAM. The memory controllers are connected to an SIMD type arithmetic processing section. A control register is connected to the memory controllers. The control register controls transfer of image data between the RAMs and the SIMD type arithmetic processing section.

17 Claims, 16 Drawing Sheets

U.S. PATENT DOCUMENTS

| | | | |
|---|---|---|---|
| 6,023,746 A * | 2/2000 | Arimilli et al. | 711/118 |
| 6,032,234 A * | 2/2000 | Kishi | 711/158 |
| 6,038,350 A * | 3/2000 | Iwase et al. | 382/304 |
| 6,041,139 A | 3/2000 | Okubo et al. | |
| 6,049,859 A * | 4/2000 | Gliese et al. | 712/17 |
| 6,052,129 A * | 4/2000 | Fowler et al. | 345/620 |
| 6,151,457 A | 11/2000 | Kawamoto | |
| 6,229,954 B1 * | 5/2001 | Yamagami et al. | 386/117 |
| 6,704,456 B1 * | 3/2004 | Venable | 382/266 |

FOREIGN PATENT DOCUMENTS

| | | |
|---|---|---|
| JP | 09-212637 | 8/1997 |
| JP | 09-231347 | 9/1997 |
| JP | 10-289306 | 10/1998 |

* cited by examiner

METHOD AND APPARATUS FOR IMAGE PROCESSING, AND A COMPUTER PRODUCT

FIELD OF THE INVENTION

The present invention relates to a technology of image processing in an apparatus comprising an arithmetic processing unit of SIMD (Single Instruction Multiple Data stream) type.

BACKGROUND OF THE INVENTION

Recently, an image forming apparatus using an SIMD type processor has been studied. The SIMD type arithmetic processing unit is for executing a single instruction in parallel, and is composed of a plurality of processor elements (PEs). Moreover, the SIMD type processor can be easily arranged to correspond to a change in the system specification change. Furthermore, functions can be easily added to the SIMD type processor just by changing the program. Accordingly, the SIMD type processor has an advantage in that image processing can be performed by high-speed arithmetic processing.

The SIMD type processor is provided with memories corresponding to each processing executed in parallel. The image processing apparatus writes the input or generated image data once in such memories, then reads and transfers the written image data to the SIMD type processor to thereby adjust the operation timing of each image processing.

For example, in Japanese Patent Application Laid-Open (JP-A) No. 10-289306, a memory control unit for adjusting the write and read timing with respect to the memory of the image data is disclosed. According to such a memory control unit, a time lag at the time of write and read of the image data is removed, thereby enabling efficient control of image processing.

According to the above-described construction, however, the timing of write and read with respect to the memory can be adjusted, but the operation of write and read with respect to the memory can not be controlled. Therefore, with conventional image processing apparatus, there is still room for improvement in optimization of write and read processing with respect to the memory in accordance with the image processing, and for efficiency improvement of image processing.

SUMMARY OF THE INVENTION

It is an object of the present invention to provide a technology of optimizing the read/write processing in the memory and thereby efficiently perform the image processing.

According to one aspect of the present invention, transfer of image data performed between the arithmetic processing section and the memory is controlled by a memory controller, to thereby increase the image data processing efficiency of the arithmetic processing section. Moreover, such an effect becomes noticeable particularly in the SIMD type arithmetic processing section that can perform the same processing with respect to a plurality of different image data.

Further, the memory controller is connected to a control register. This control register has a data transfer mode setting function for setting the data transfer mode of the memory connected to the memory controller.

Further, the controller register changes over setting of a random access mode in which an address is set to access the memory, and setting of an automatic access mode in which an address is automatically updated to access the memory, in accordance with a control signal provided from outside.

Further, the control register reads data redundantly from the memory, in accordance with a control signal provided from outside, and sets a redundant readout transfer mode for transferring data to the arithmetic processing section.

Further, the control register reads data from the arithmetic processing section by thinning out, in accordance with a control signal provided from outside, and sets a thinning-out read transfer mode for transferring data to the memory.

According to another aspect of the present invention, a computer readable recording medium records a computer program containing instruction which when executed on a computer realizes the steps of the method according to the present invention.

Other objects and features of this invention will become apparent from the following description with reference to the accompanying drawings.

DESCRIPTION OF THE PREFERRED EMBODIMENTS

Preferred embodiments of the image processing apparatus, the image processing method and computer readable recording medium for recording a program for a computer to execute the method, according to the present invention, will now be described in detail below with reference to accompanying drawings. A construction which is common to all the embodiments will be described first.

Figure 1:
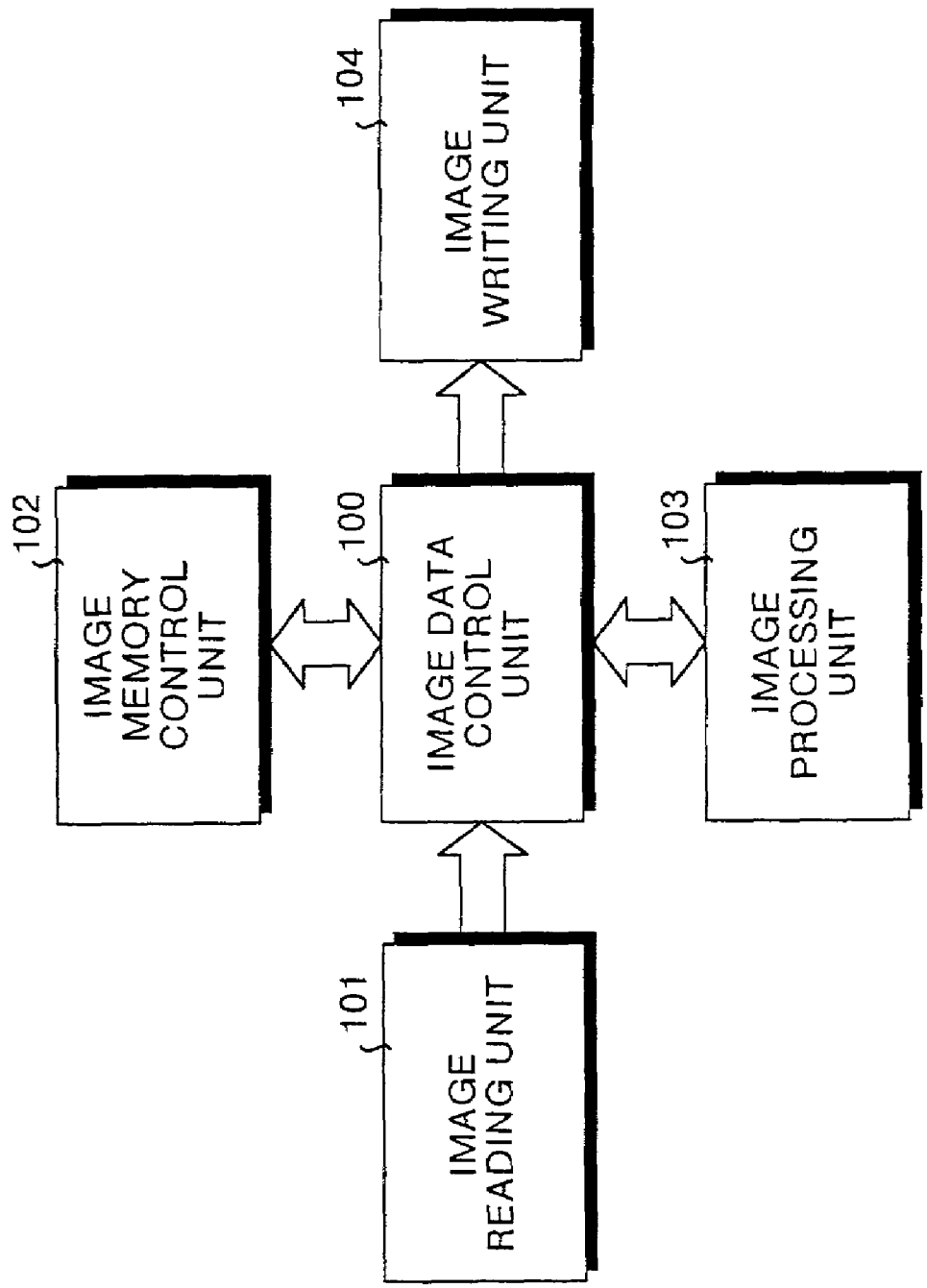
FIG. 1 is a block diagram functionally showing the construction of an image processing apparatus according to the embodiment of the present invention.

The image processing apparatus according to the present invention is an image processing apparatus comprising arithmetic processing unit for processing image data, being a digital signal prepared based on an image, as a manifest image. The principle of such an image processing apparatus will now be described. FIG. 1 is a block diagram functionally showing the construction of an image processing apparatus according to the embodiment of the present invention. In FIG. 1, the image processing apparatus has a construction including 5 units described below.

That is the image processing apparatus comprises an image data control unit 100; an image read unit 101 for reading image data; an image memory control unit 102 for controlling image memory that stores images to perform write/read of image data; an image processing unit 103 for applying image processing such as processing/edit with respect to the image data; and an image writing unit 104 for writing the image data onto a transfer medium such as a paper.

The above each unit is constructed, putting the image data control unit 100 in the center. That is to say, the image read unit 101, the image memory control unit 102, the image processing unit 103 and the image writing unit 104 are respectively connected to the image data control unit 100. These respective units will now be described.

Image Data Control Unit 100:

The image data control unit 100 performs, for example, following processing:
(1) Data compression to improve data transmission efficiency on the bus (Primary compression)
(2) Transfer of the primarily compressed data to image data
(3) Image synthesis (Image data from a plurality of units can be synthesized. Further, the synthesis includes image synthesis on the data bus.)
(4) Image shift (Shift of an image in a main scanning direction and an auxiliary scanning direction)
(5) Expansion of an image area (Image area can be expanded to its periphery by an arbitrary amount.)
(6) Image scaling (Scaling fixed to 50% or 200%, for example)
(7) Parallel bus/interface processing
(8) Serial bus/interface processing (Interface to a process controller 211 explained later)
(9) Format conversion between parallel data and serial data
(11) Interface processing to the image reading unit 101
(12) Interface processing to the image processing unit 103

Image Reading Unit 101:

The image reading unit 101 performs, for example, following processing:
(1) Scanning light reflected off a document by an optical system
(2) Conversion of data to electric signals in a photoreceptor
(3) Digitization in an A/D converter
(4) Shading correction (Correction to nonuniformity in illumination distribution of a light source)
(5) Scanner γ-correction (Correction to density characteristics in the scanning system)

Image Memory Control Unit 102:

The image memory control unit 102 performs, for example, following processing:
(1) Control for interface to the system controller
(2) Parallel bus control (Control for interface to the parallel bus)
(3) Network control
(4) Serial bus control (Control for a plurality of external serial ports)
(5) Internal bus interface control (Control for commands with the operation section)
(6) Local bus control (Control for access to ROM, RAM, and font data to start up the system controller)
(7) Control for operation of memory module (Controls for write/read of data in/from the memory module, or the like)
(8) Control for access to the memory module (Processing for controlling memory-access requests from a plurality of units)
(9) Data compression/decompression (Processing for reducing data amounts to make effectively use of the memory)
(10) Image editing (Clearing of data in a memory area, rotation of image data, and image synthesis on the memory, or the like)

Image Processing Unit 103:

The image processing unit 103 performs, for example, following processing:
(1) Shading correction (Correction to nonuniformity in illumination distribution of the light source)
(2) Scanner γ-correction (Correction to density characteristics in the scanning system)
(3) MTF correction
(4) Smoothing
(5) Scaling to an arbitrary size in the main scanning direction
(6) Density conversion (γ conversion: corresponding to a density notch)
(7) Simple multi-value processing
(8) Simple binarization
(9) Error diffusion
(10) Dithering
(11) Phase control for dot arrangement (dots aligned on the right, dots aligned on the left)
(12) Removal of isolated points
(13) Separation of image area (Determination of color, determination of an attribute, processing for adaptation)
(14) Density conversion Image Writing Unit 104:

The image writing unit 104 performs, for example, following processing:
(1) Edge smoothing (Jaggy correction)
(2) Correction for re-arrangement of dots
(3) Pulse control for image signals
(4) Format conversion between parallel data and serial data.

Figure 2:
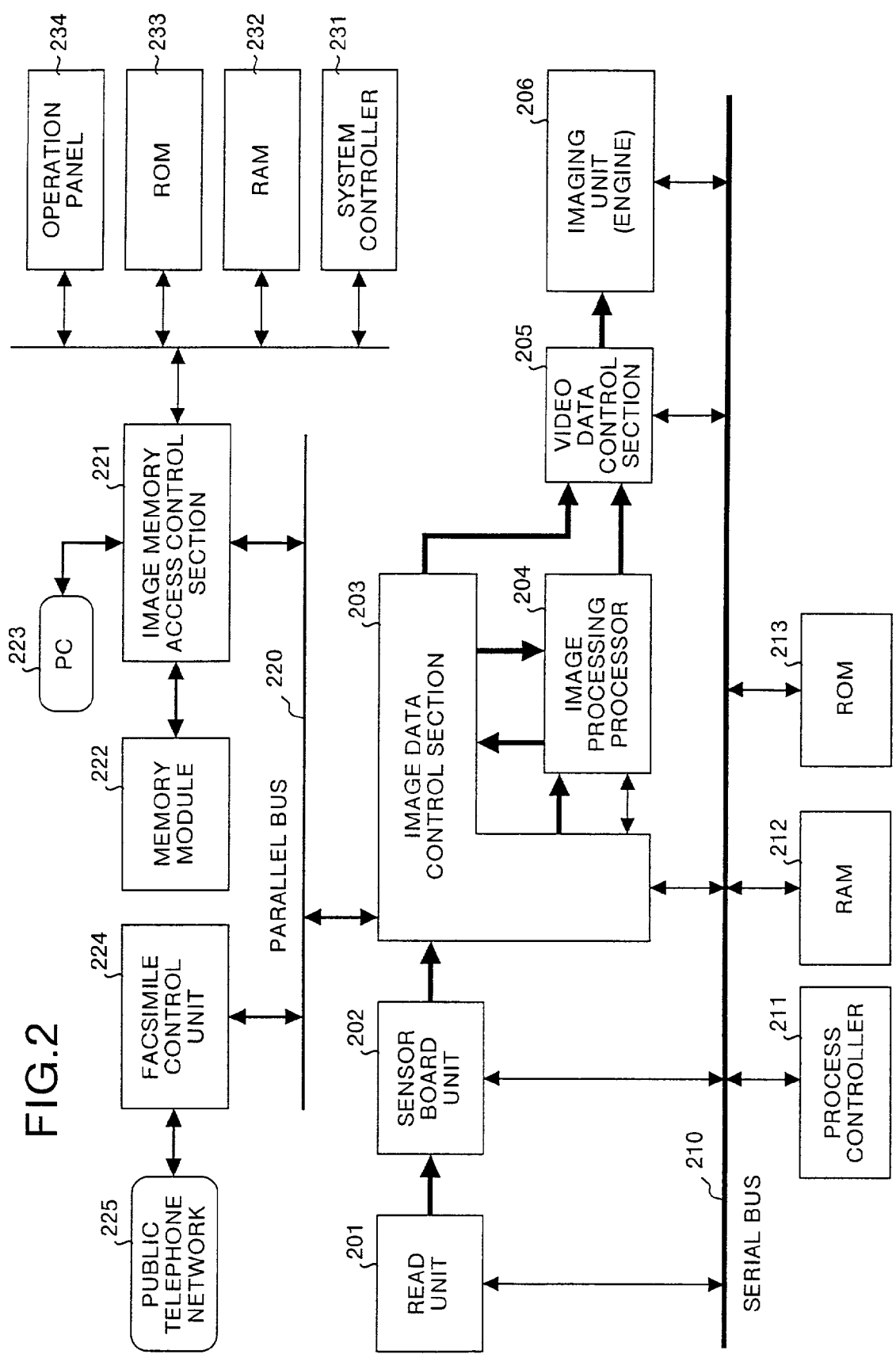
FIG. 2 is a block diagram showing one example of the hardware construction of an image processing apparatus according to the embodiment.

The hardware construction when the image processing apparatus according to the present embodiment constitutes a digital compound machine will now be described. FIG. 2 is a block diagram showing one example of the hardware construction of the image processing apparatus according to the present embodiment.

As shown in FIG. 2, the image processing apparatus comprises a read unit 201; a sensor board unit 202; an image data control section 203; an image processing processor 204; a video data control section 205; and an imaging unit (engine) 206. Moreover, the image processing apparatus comprises a process controller 211, a RAM 212 and a ROM 213, via a serial bus 210.

The image processing processor 204 is programmable image processing means which processes such that the image data, being a digital signal prepared based on an image, can be output as a manifest image, and which can realize a plurality of image forming operations. Moreover, the image data control section 203 is image data transmission control means for collectively controlling transmission of image data between the data bus for transmitting the image data and the processing unit used for image processing by means of the image processing processor 204. The present invention relates to the image processing processor 204, and the construction of the image processing processor 204 will be described in detail with reference to drawings from FIG. 3 onward.

The image processing apparatus according to this embodiment comprises an image memory access control section 221 and a facsimile control unit 224 via a parallel bus 220, and further comprises a memory module the memory module 222, a system controller 231, a RAM 232, a ROM 233, and an operation panel 234, each connected to the image memory access control section 221. In such a construction, the image memory access control section 221 and the memory module 222 are the image data storage control means for collectively controlling the access of the image data with respect to the RAM 212 and ROM 213.

The above described each component and the relation with each unit 100 to 104 shown in FIG. 1 will now be described. The read unit 201 and the sensor board unit 202 realize the function of the image read unit 101 shown in FIG. 1. The image data control section 203 realizes the function of the image data control unit 100. Similarly, the image processing processor 204 realizes the function of the image processing unit 103.

The video data control section 205 and the imaging unit (engine) 206 realize the function of the image writing unit 104. The image memory access control section 221 and the memory module 222 realize the function of the image memory control unit 102.

The contents of each component will now be described. The read unit 201 that optically reads the document comprises a lamp, a mirror and a lens, so that the reflected light of the lamp irradiation with respect to the document is collected onto a light-receiving element by the mirror and the lens.

The light-receiving element, for example, CCD is mounted on the sensor board unit 202, and the image data converted to an electric signal in the CCD is converted to a digital signal, and then output (transmitted) from the sensor board unit 202.

The image data output (transmitted) from the sensor board unit 202 is input into (received by) the image data control section 203. Transmission of image data between the function devices (processing units) and the data bus is controlled by the image data control section 203.

The image data control section 203 performs data transfer between the sensor board unit 202, the parallel bus 220 and the image processing processor 204 with regard to the image data, and communication between the process controller 211 and the system controller 231 that takes charge of the whole control of the image processing apparatus with respect to the image data. Moreover, the RAM 212 is used as a work area of the process controller 211, and the ROM 213 stores a boot program or the like of the process controller 211.

The image data output (transmitted) from the sensor board unit 202 is transferred (transmitted) to the image processing processor 204 via the image data control section 203, to correct signal deterioration involved in quantization with respect to the optical system and the digital signal (signal deterioration of the scanner system) and is again output (transmitted) to the image data control section 203.

The image memory access control section 221 controls write and read of the image data with respect to the memory module 222. It also controls the operation of each component connected to the parallel bus 220. Moreover, the RAM 232 is used as the work area of the system controller 231, and the ROM 233 stores a boot program or the like of the system controller 231.

The operation panel 234 inputs a processing to be performed by the image processing apparatus. For example, it inputs a type of processing (copy, facsimile transmission, image read, printing, or the like) and number of sheets to be processed. Thereby, the image data control-information can be input. The contents of the facsimile control unit 224 will be described later.

The read image data includes a job stored in the memory module 222 and reused, and a job not stored in the memory module 222. The respective cases will be described. As an example of a job stored in the memory module 222, there is a method in which when a plurality of sheets are copied with regard to one document, the read unit 201 is operated only once, the image data read by the read unit 201 is stored in the memory module 222, and the stored image data is read out plural times.

As an example of not using the memory module 222, when only one copy is reproduced from one sheet of document, the read image data needs be directly reproduced. Therefore, access to the memory module 222 by the image memory access control section 221 is not necessary.

At first, when the memory module 222 is not used, the data transferred from the image processing processor 204 to the image data control section 203 is again returned from the image data control section 203 to the image processing processor 204. The image processing processor 204 performs image quality processing for converting the luminance data by the CCD in the sensor board unit 202 to the area gradation.

The image data after the image quality processing is transferred from the image processing processor 204 to the video data control section 205. The signal converted to the area gradation is subjected to the post processing related to the dot arrangement and the pulse control for reproducing the dot, and thereafter, a reproduced image is formed on a paper in the imaging unit 206.

Next, the image data flow when the image data is stored in the memory module 222 and additional processing, for example, rotation of the image direction, synthesis of the image or the like is performed at the time of image readout will be described. The image data transferred from the image processing processor 204 to the image data control section 203 is transmitted from the image data control section 203 to the image memory access control section 221 via the parallel bus 220.

Here, access control of the image data and the memory module 222 under the control of the system controller 231, development of printing data in an external PC (personal computer) 223, and compression/expansion of image data for effectively utilizing the memory module 222 are performed.

The image data transmitted to the image memory access control section 221 is stored in the memory module 222 after data compression, and the stored image data is read out according to need. The read-out image data is expanded to be returned to the original image data, and returned from the image memory access control section 221 to the image data control section 203 via the parallel bus 220.

After transfer from the image data control section 203 to the image processing processor 204, the image quality processing and pulse control in the video data control section 205 are performed, to thereby form a reproduced image on a paper in the imaging unit 206.

In the image data flow, the function of the digital compound machine is realized by the bus control in the parallel bus 220 and the image data control section 203. The facsimile transmission function is for executing image processing with respect to the read-out image data in the image processing processor 204, and transferring the image data to the facsimile control unit 224 via the image data control section 203 and the parallel bus 220. In the facsimile control unit 224, the image data is subjected to data conversion for the communication network, and transmitted to the public telephone network 225 as facsimile data.

On the other hand, the received facsimile data is converted from the line data from the public telephone network 225 to image data in the facsimile control unit 224, and transferred to the image processing processor 204 via the parallel bus 220 and the image data control section 203. In this case, special image quality processing is not performed, and dot rearrangement and pulse control are performed in the video data control section 205, to thereby form a reproduced image on a paper in the imaging unit 206.

In the case where a plurality of jobs, for example, copy function, facsimile transfer function and printer output function are operated in parallel, allotment of right of use of the read unit 201, the imaging unit 206 and the parallel bus 220 is controlled in the system controller 231 and the process controller 211.

The process controller 211 controls the image data flow, and the system controller 231 controls the whole system and controls activation of each resource. Moreover, the function selection of the digital compound machine is selectively input by the operation panel (operation section) 234, to thereby set the processing content of copy function, facsimile function or the like.

The system controller 231 and the process controller 211 communicate with each other via the parallel bus 220, the image data control section 203 and the serial bus 210. Specifically, data format conversion for the data interface with the parallel bus 220 and the serial bus 210 is performed in the image data control section 203, to thereby perform communication between the system controller 231 and the process controller 211.

Figure 3:
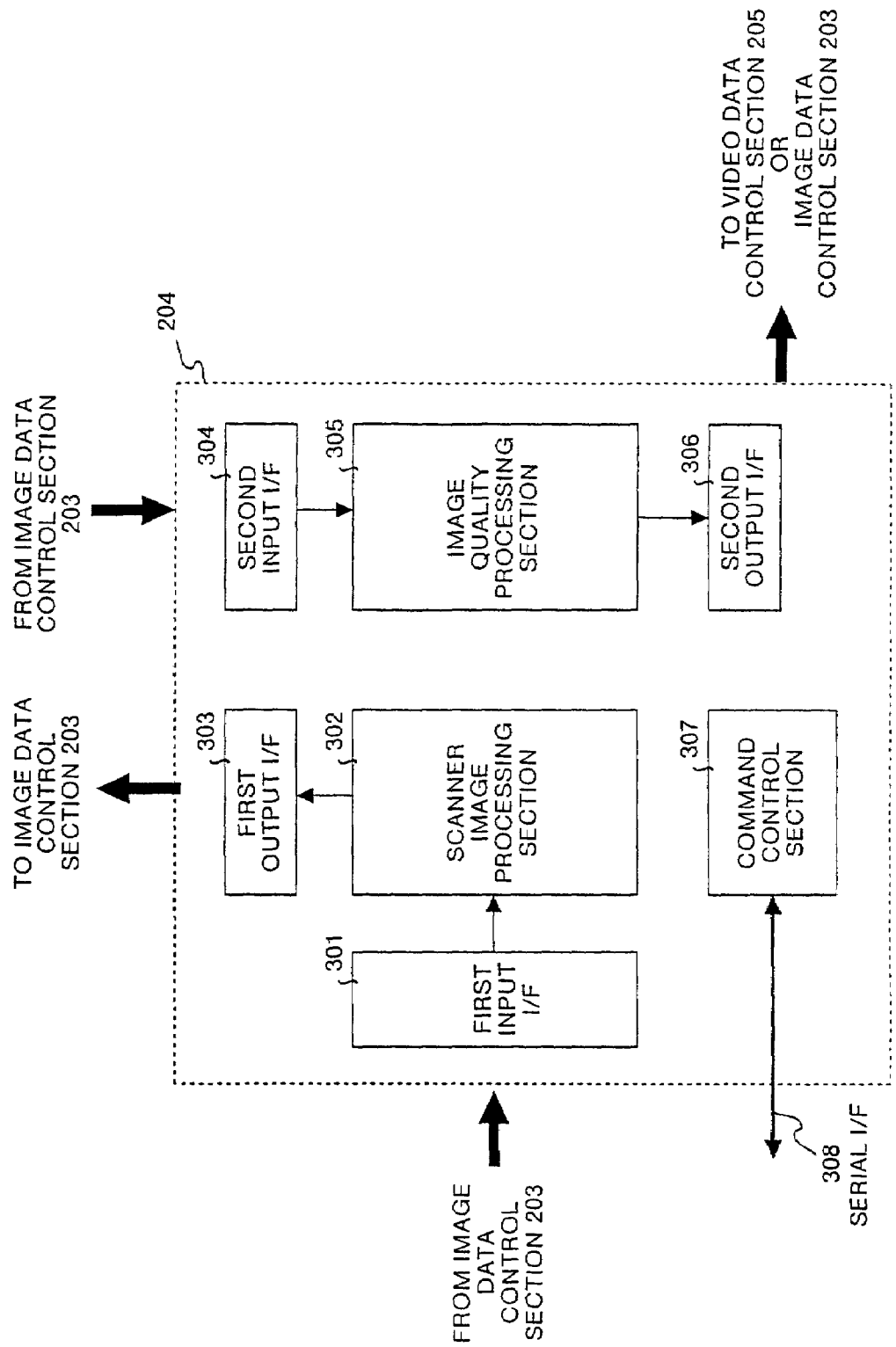
FIG. 3 is a block diagram showing one example of the hardware construction of an image processing processor in an image processing apparatus according to the embodiment.

Among the above-described construction, the summary of processing in the image processing processor 204 constituting the image processing unit 103 will be described. FIG. 3 is a block diagram showing the summary of processing in the image processing processor 204 in the image processing apparatus according to this embodiment.

In the block diagram of FIG. 3, the image processing processor 204 has a construction including a first input I/F (I/F) 301, a scanner image processing section 302, a first output I/F 303, a second input I/F 304, an image quality processing section 305 and a second output I/F 306.

The read-out image data is transmitted from the first input I/F 301 of the image processing processor 204, via the sensor board unit 202 and the image data control section 203, to the scanner image processing section 302.

The scanner image processing section 302 is for correcting deterioration of the read-out image data, and specifically, performs shading correction, scanner γ correction, MTF correction or the like. Though not being the correction processing, variable frame processing such as enlargement or reduction may be performed. When the correction processing of the read-out image data is completed, the image data is transferred to the image data control section 203 via the first output I/F 303.

At the time of output onto the paper, the image data from the image data control section 203 is received from the second input I/F 304, and the image data is subjected to the area gradation processing in the image quality processing section 305. The image data after the image quality processing is output to the video data control section 205 or the image data control section 203 via the second output I/F 306.

The area gradation processing in the image quality processing section 305 includes concentration conversion processing, dither processing, error diffusion processing and the like, and the principal processing is area approximation of the gradation information. If the image data processed by the scanner image processing section 302 is once stored in the memory module 222, the image quality processing can be changed by the image quality processing section 305 to thereby confirm various reproduced images.

For example, concentration of the reproduced image is waved (changed), or number of lines in the dither matrix is changed, thereby enabling easy change of the atmosphere of the reproduced image. At this time, it is not necessary to re-read an image from the read unit 201 every time the processing is changed, and by reading the image data stored in the memory module 222, different processing can be rapidly performed many times with respect to the same image data.

When processing the generated image data by using a function as a single-purpose scanner in the image processing apparatus, the image processing processor 204 performs the scanner image processing and the gradation processing together, and outputs the data to the image data control section 203. The processing contents can be programmably changed. The changeover of the processing and the change in the processing procedure are controlled in the command control section 307 via the serial I/F 308.

Figure 4:
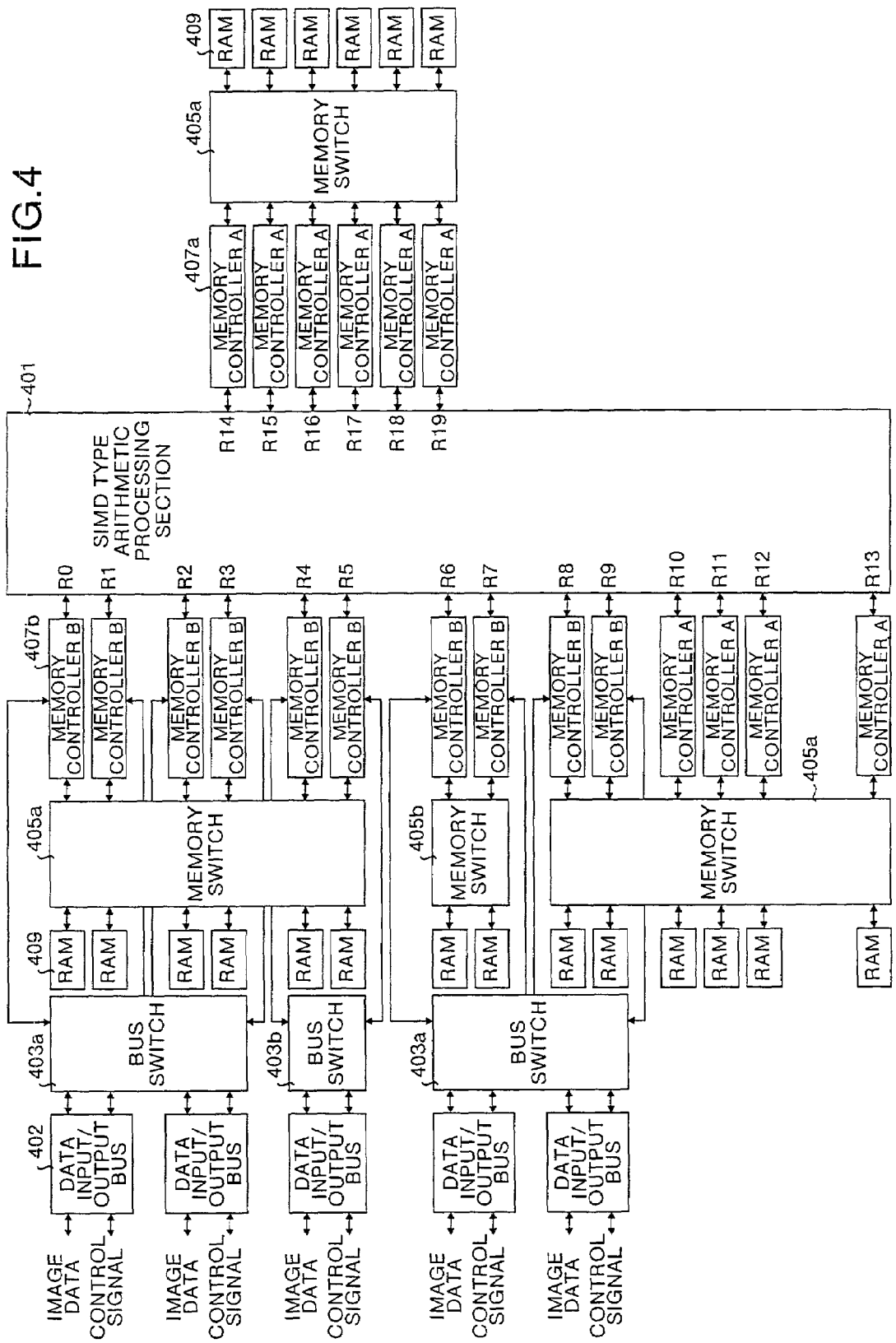
FIG. 4 is a diagram showing in detail the construction of an image processing processor according to the embodiment.

FIG. 4 is a diagram for explaining the internal construction of the image processing processor 204 in the first embodiment of the present invention. That is, the processing of the image processing processor 204 shown in FIG. 3 is realized with the configuration shown in FIG. 4.

The construction shown in FIG. 4 comprises an SIMD type arithmetic processing section 401 which can process a plurality of image data at the same time, memory controllers A 407a or memory controllers B 407b for controlling each of a plurality of RAM 409 connected to the SIMD type arithmetic processing section 401. The memory controllers in the first to fourth embodiments in the present invention respectively comprise a control register as shown below.

A memory switch 405a and a memory switch 405b are respectively disposed between the memory controllers A 407a, memory controllers B 407b and the RAM 409, to thereby change over the connection state of the RAM 409 with respect to registers R0 to R19 in the SIMD type arithmetic processing section 401. Due to this changeover, the overall capacity of the RAM 409 connected to respective registers R0 to R19 is controlled.

Moreover, bus switches 403a, 403b for controlling the data bus for transferring the image data to the plurality of RAM 409 are provided. Among these bus switches, the bus switch 403a connects with two data input/output buses 402, and the bus switch 403b connects with one data input/output bus 402. Moreover, among the memory controllers, the memory controller A 407a refers to the one that is not connected to the data input/output bus 402 and the bus switches 403a and 403b. Furthermore, the memory controller B 407b refers to the one connected to the data input/output bus 402 and the bus switches 403a and 403b.

In this first embodiment and the other embodiments described later, the memory controllers A 407a and the memory controllers B 407b control transfer of image data performed between the RAM 409 and the SIMD type arithmetic processing section 401. The specific contents of this control will be described later.

The above-described construction operates as described below. That is to say, the image data is input into the image processing processor 204 via the data input/output bus 402. Then, the image data is input into the memory controllers B 407b via the bus switch 403a and the bus switch 403b, and stored once in the RAM 409 from the memory controllers B 407b.

Moreover, the image data stored in the RAM 409 is read out in response to the processing in the SIMD type arithmetic processing section 401, and again input into the SIMD type arithmetic processing section 401 via the memory switch 405a, the memory controller A 407a and the memory controller B 407b. The SIMD type arithmetic processing section 401 transfers the image data to an internal processor element (PE) to thereby execute the image processing with respect to the image data. When the RAM 409 is used in the processing in the processor element, the image data is transferred between the processor element and the RAM 409 via the memory controller A 407a and the memory controller B 407b.

Figure 5:
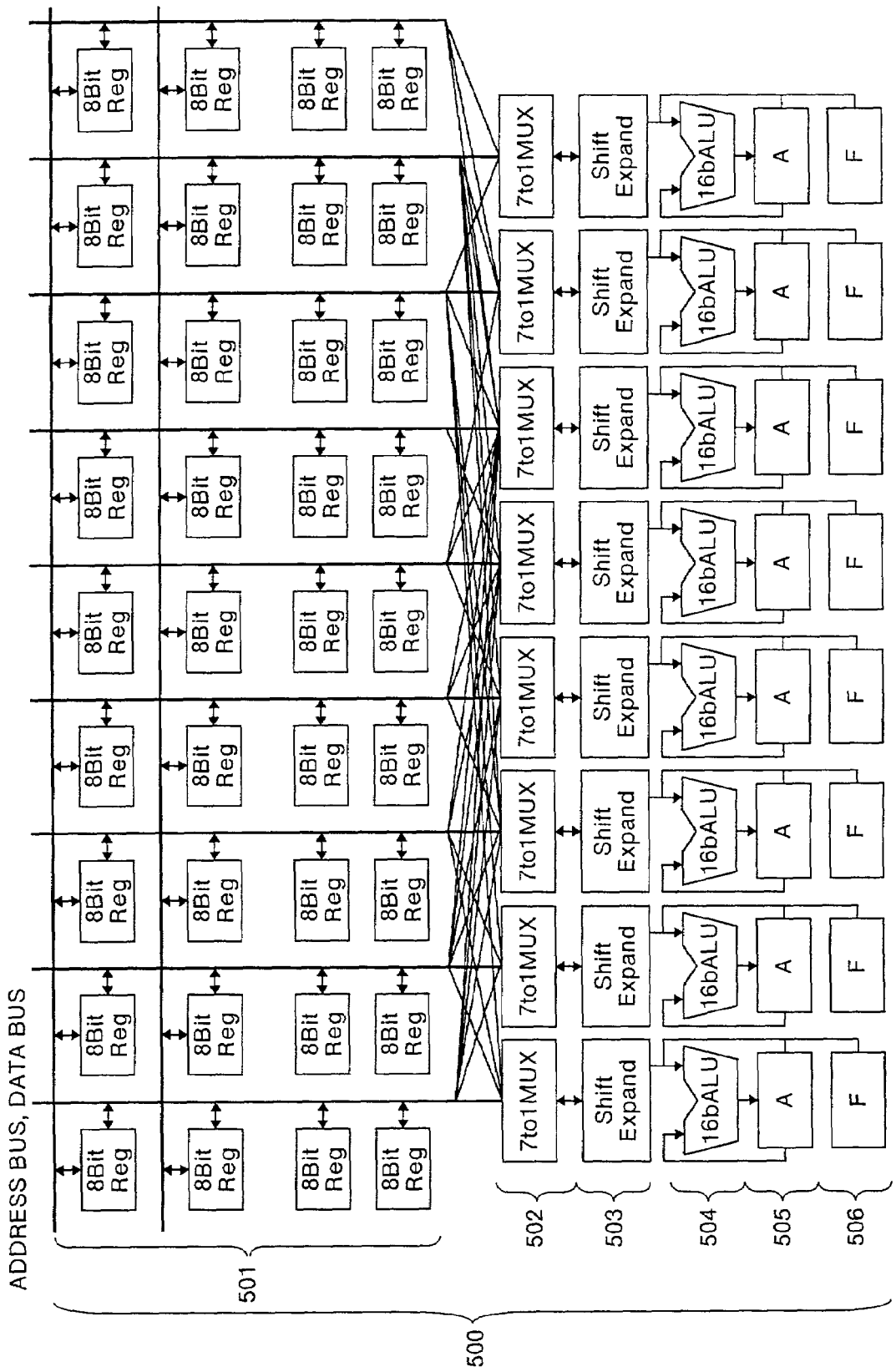
FIG. 5 is a diagram showing the schematic construction of an SIMD type processor used in an image processing apparatus according to the embodiment.

The internal construction of the image processing section 401 will now be described. FIG. 5 is a diagram for explaining the schematic construction of the SIMD type processor. The SIMD is for executing a single command in parallel with respect to a plurality of data, and is composed of a plurality of processor elements 500.

Each processor elements 500 comprises a register (Reg) 501 for storing data, a multiplexer (MUX) 502 for accessing a register in other processor element 500, a barrel shifter (Shift Expand) 503, an arithmetic logic unit (ALU) 504, an accumulator (A) 505 for storing the logic result, and a temporary register (F) 506 for temporarily evacuating the contents of the accumulator 505.

Each register 501 is connected to the address bus and the data bus (lead wire and word line), and stores a command code for regulating the processing and data to be processed. The contents of the register 501 are input into the arithmetic logic unit 504, and the arithmetic processing result is stored in the accumulator 505. In order to take the result out to outside of the processor element 500, the result is once evacuated to the temporary register 506. By taking out the content of the temporary register 506, the processing result with respect to the data to be processed can be obtained.

The command code is given to each processor element 500 with the same content, and the data to be processed is given to each processor element 500 in a different state. The arithmetic result is processed in parallel by referring to the content of the register 501 of the adjacent processor element 500 in the multiplexer 502, and is output to each accumulator 505.

For example, if the content in one line of the image data is arranged in the processor element 500 for each pixel, and subjected to the arithmetic processing with the same command code, the processing result for one line can be obtained in a short period of time than processing one pixel each sequentially. In particular, the command code for each processor element 500 in the space filter processing and the shading correction processing is an arithmetic expression itself, and common processing can be performed with respect to all processor elements 500.

Figure 6:
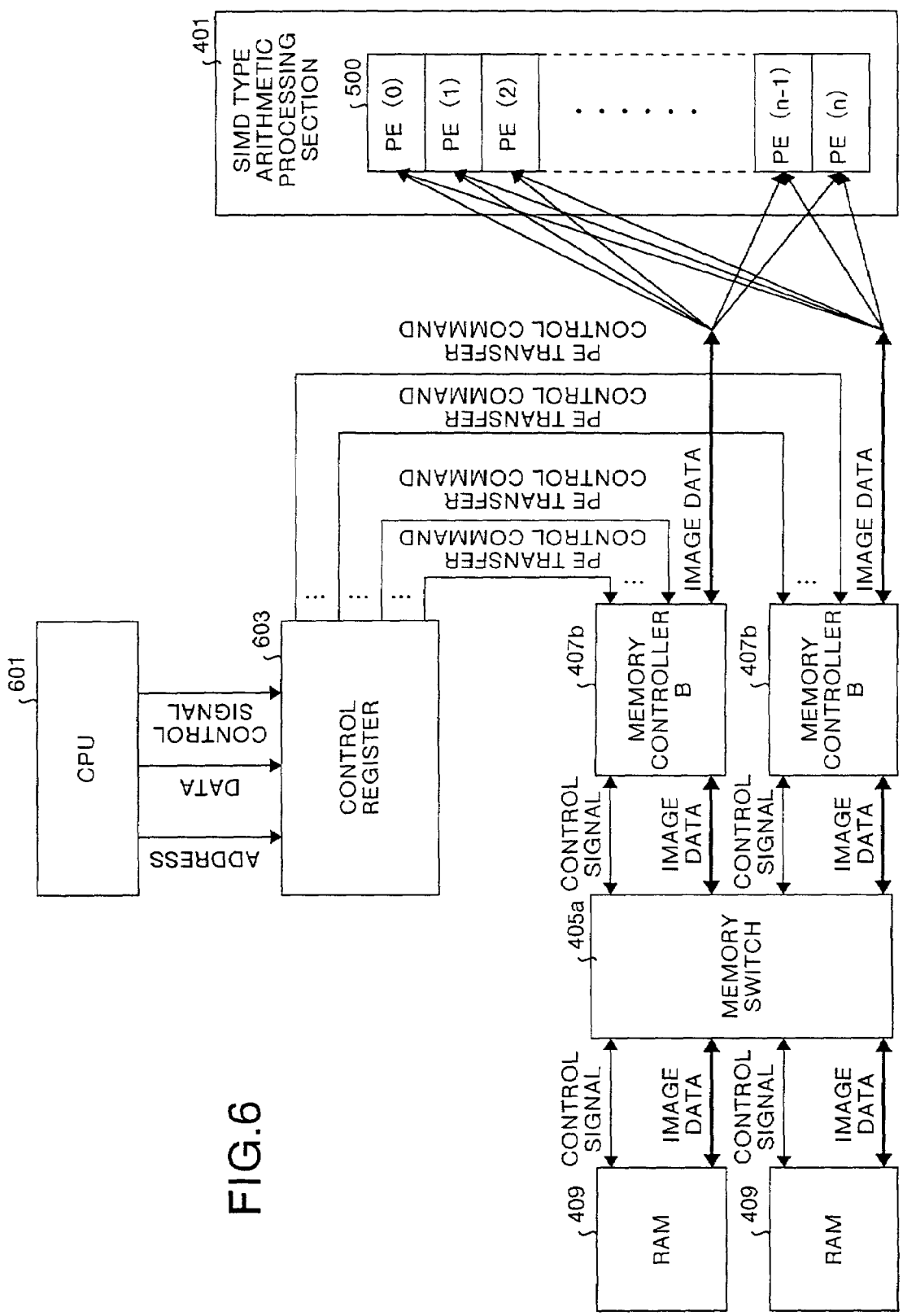
FIG. 6 is a schematic diagram for explaining the image data transfer control in a first embodiment.

The control of transfer of the image data performed between the RAM 409 and the SIMD type arithmetic processing section 401 by means of the memory controller A 407a and the memory controller B 407b in the first embodiment will now be described. FIG. 6 is a schematic diagram for explaining the image data transfer control. Since this transfer control is performed similarly with respect to each of the memory controller A 407a and the memory controller B 407b, only the memory controller B 407b is shown in FIG. 6.

As shown in FIG. 6, the memory controllers B 407b are connected to the control register 603. This control register 603 has an image data transfer mode setting function for setting the image data transfer method (image data transfer mode) performed between the RAM 409 connected to the memory controllers B 407b and the processor element 500.

Following are input into the control register 603. That is, an address of the RAM 409 to be controlled (in the figure, simply written as address), data showing the write condition to the RAM 409 (write data, simply written as data in the figure), and the control signal, from the CPU 601 outside of the image processing processor 204 (for example, in the process controller 211).

The control register 603 comprises a register for setting a write address which specifies an address of the RAM 409 in which the image data is to be written, number of write words for setting the number of words to be written, an order for the processor element 500 to write the image data, write offset for setting the number of the processor element 500 to start writing (shown in (0), (1), . . . in the figure), a final address for setting the memory capacity to be used (determined by the number of RAM 409 connected to the register), a read address which specifies the address of the RAM 409 in which the image data is read, and the number of words to be read which sets the word number at the time of read.

When the address of the register, write data to the RAM 409 and the control signal described above are input, a predetermined value (control register value) is set to each register. Thereby, the control register 603 generates a PE transfer control command for controlling the memory controller B 407b. Therefore, the PE transfer control command includes information of write address, number of write words, write offset, final address, read address and number of reads.

The memory controller B 407b inputs such a PE transfer control command, generates a control signal corresponding to the PE transfer control command, and inputs the control signal to the RAM 409 via the memory switch 405a. As a result, the RAM 409 transfers image data (shown by a thick line) to/from the processor element 500 in the SIMD type arithmetic processing section 401 in a transfer mode in accordance with the control signal.

The image data transfer mode includes PE write transfer for repeating the processing in which image data is sequentially read from the processor element 500 specified by the write offset, and the image data is transferred to the RAM 409 specified by the write address, by the number of write words, PE read transfer for repeating the processing in which image data is read from the RAM 409 specified by the read address, and the image data is transferred to the processor element 500 in accordance with the setting of write offset, by the number of read words, and PE write/read transfer for starting PE write transfer, and after completion of this transfer, starting PE read transfer.

The image data transfer mode which can be set in the control register of the present invention, other than the above-described mode, includes a mode in which image data transfer is performed by changing over the random access mode and the automatic access mode, a redundant readout mode and a thinning-out write mode. These image data transfer modes will be described in Embodiments described below.

Figure 7:
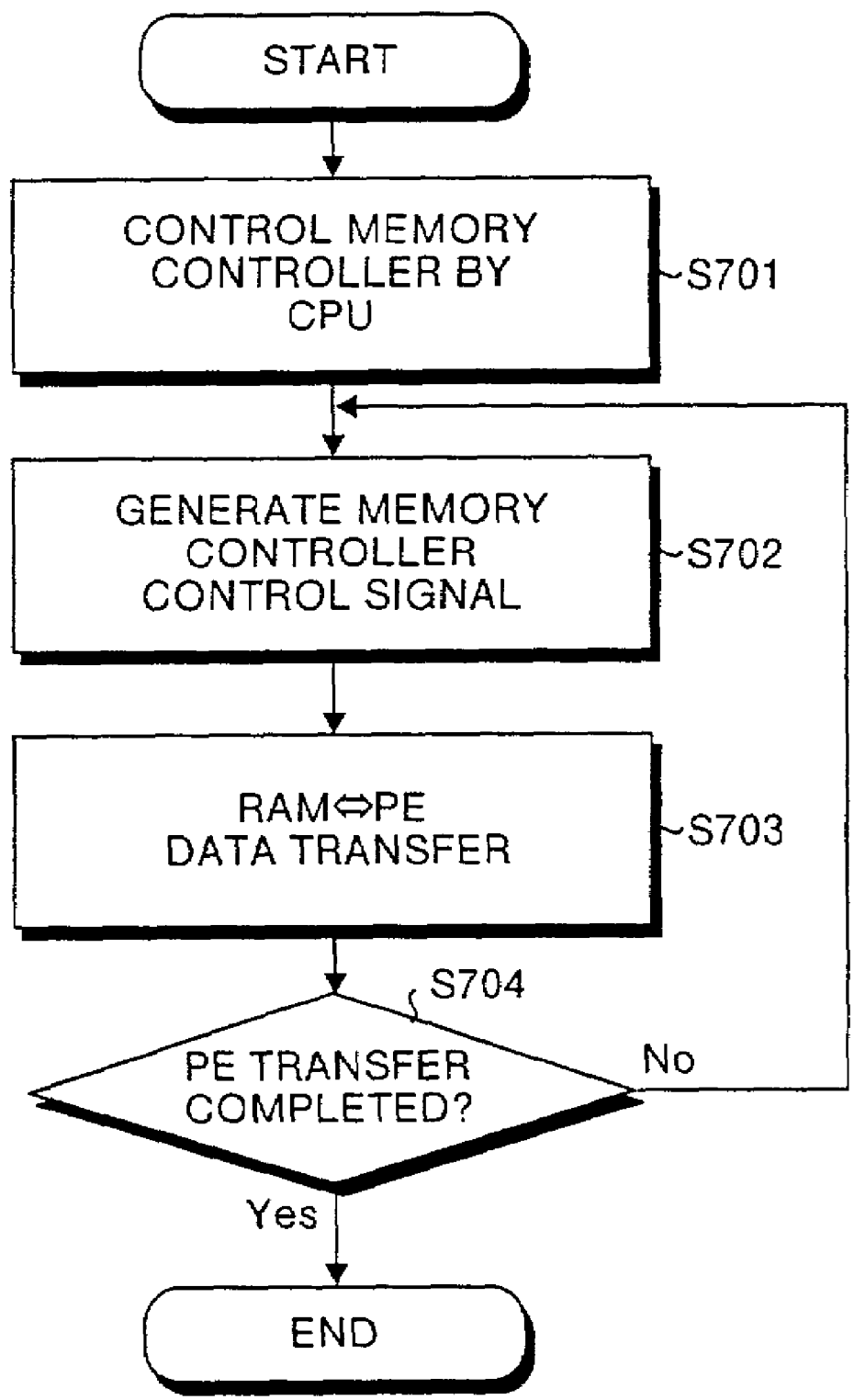
FIG. 7 is a flowchart for explaining the summary of the image data transfer control common to all embodiments of the present invention.
Figure 8:
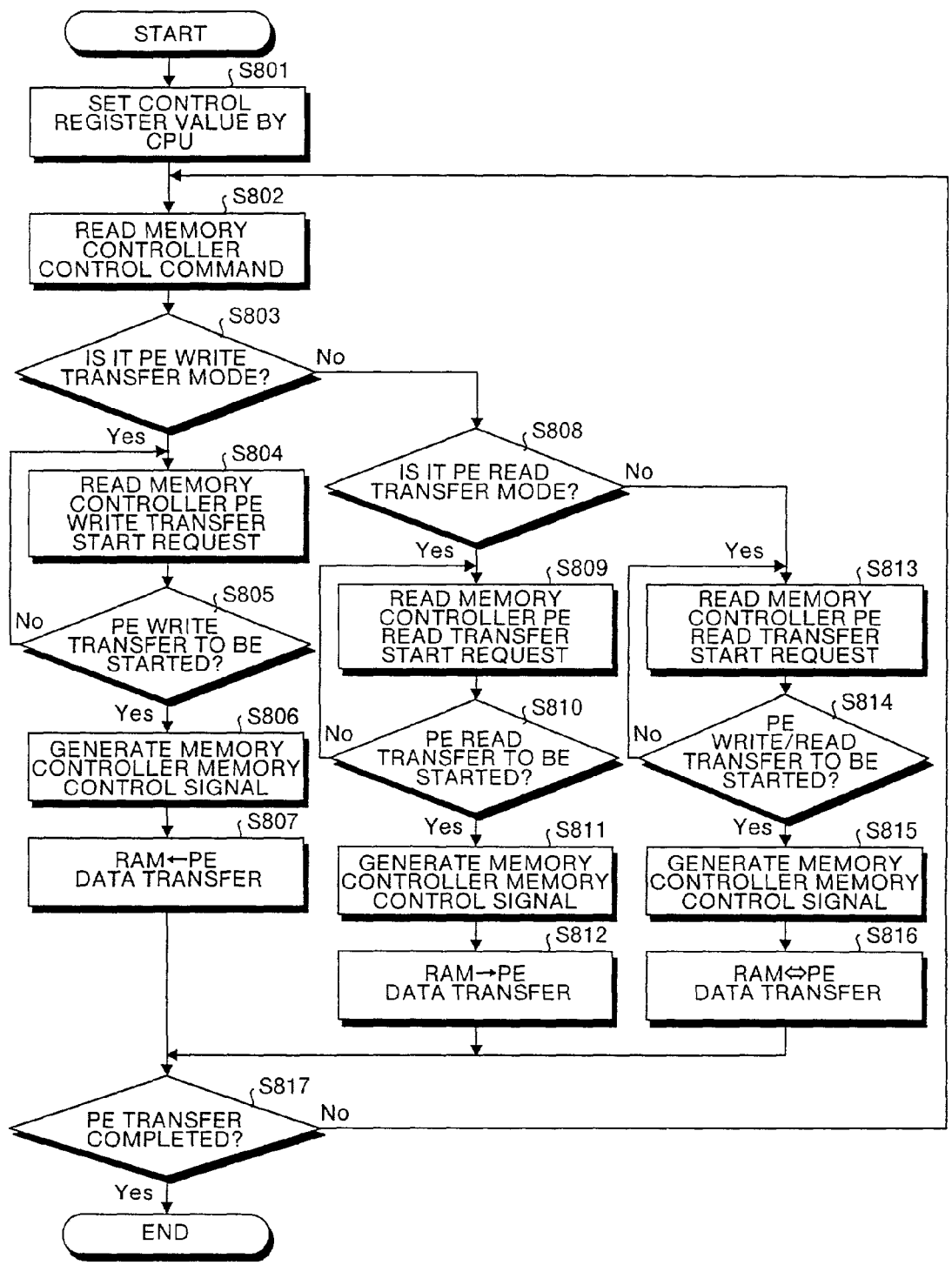
FIG. 8 is a flowchart for explaining the image data transfer control in the first embodiment.

The processing in the first embodiment will now be described. FIG. 7 is a flowchart for explaining the summary of the image data transfer control common to all the embodiments of the present invention. FIG. 8 is a flowchart for specifically explaining the image data transfer control particularly in the first embodiment.

As shown in FIG. 7, with the image data transfer control according to the present invention, the CPU 601 controls the memory controller B 407b so as to set the register conditions in the control register 603 (step S701). Due to this control, the control register 603 controls the memory controller A 407a and memory controller B 407b (hereinafter, memory controller B 407b, unless particularly specified) and a control signal is generated from the memory controller B 407b (step S702).

The control signal generated in step S702 is input into the RAM 409 via the memory switch 405a or memory switch 405b (hereinafter, memory switch 405a, unless particularly specified). The RAM 409 transfers image data to/from the processor element 500 in the SIMD type arithmetic processing section 401 according to the control signal (step S703).

After the above-described processing, the control register 603 judges whether transfer to the processor element 500 has been completed or not (step S704), and if not (NO in step S704), the control signal is again generated (step S702). On the other hand, if the transfer has been completed (YES in step S704), the processing of image data transfer control is completed.

The above-described processing will be described more specifically with regard to the first embodiment. As shown in FIG. 8, the CPU 601 sets a control register value in a register of the control register 603 (step S801). The memory controller B 407b reads the control register value as the PE transfer control command (step S802), and judges whether the PE transfer control command shows the PE write transfer mode or not (step S803).

As a result of judgment in step S803, if the memory controller B 407b judges that the PE transfer control command is the PE write transfer mode (YES in step S803), the memory controller B 407b reads the PE write transfer start request (step S804), and then judges whether to start PE write transfer or not (step S805).

As a result of judgment in step S805, if PE write transfer is not started (NO in step S805), the flow stands by until it is to be started by reading again the PE write transfer start request. On the other hand, if PE write transfer is to be started (YES in step S805), the memory controller B 407b generates a control signal (step S806). This control signal is input into the processor element 500, and the processor element 500 accesses the RAM 409 to thereby transfer the image data (S807).

After the above-described processing, it is judged whether the image data transfer has been completed or not (step S817). As a result of this judgment, if the transfer has not been completed (NO in step S817), the flow returns to the processing for reading the control signal from the memory controller B 407b (step S802). If the transfer has been completed (YES in step S817), the image data transfer control processing is completed.

If it is judged instep S803 that the PE transfer control command is not of the PE write transfer mode (NO in step S803), it is judged if the PE transfer control command shows the PE read transfer mode or not (step S808). If it is judged that the PE transfer control command is of the PE read transfer mode (YES in step S808), the PE read transfer start request is read (step S809), and it is judged whether the PE read transfer is to be started or not (step S810). If the PE read transfer is not to be started (NO in step S810), the flow stands by until the PE read transfer is to be started.

On the other hand, if the PE read transfer is to be started (YES in step S810), the memory controller B 407b generates a control signal (step S811), and inputs the signal to the RAM 409. The image data stored in the RAM 409 is read due to this control signal, and transferred to the processor element 500 (S812).

After the above-described processing, it is judged whether the image data transfer has been completed or not (step S817). As a result of this judgment, if the transfer has not been completed (NO in step S817), the flow returns to the processing for reading the control signal from the memory controller B 407b (step S802). If the transfer has been completed (YES in step S817), the image data transfer control processing is completed.

If it is judged in step S808 that the PE transfer control command is not of the PE read transfer mode (NO instep S808), in the flowchart of FIG. 8, it is judged that the PE transfer control command shows the PE write/read transfer mode. Then, the PE write/read transfer start request is read (step S813) and it is judged whether the PE write/read transfer is to be started or not (step S814).

If the PE write/read transfer is not to be started (NO in step S814), the flow stands by until the PE write/read transfer is started. On the other hand, if the PE write/read transfer is to be started (YES in step S814), the memory controller B 407b generates a control signal (step S815), and inputs the control signal to the processor element 500. Due to this control signal, image data transfer in the PE write/read transfer mode is performed between the RAM 409 and the processor element 500 (S816).

After the above-described processing, it is judged whether the image data transfer has been completed or not (step S817). As a result of this judgment, if the transfer has not been completed (NO in step S817), the flow returns to the processing for reading the control signal from the memory controller B 407b (step S802). If the transfer has been completed (YES in step S817), the image data transfer control processing is completed.

According to the first embodiment, the control register can control the mode of the image data transfer performed between the SIMD type arithmetic processing section 401 and the RAM 409. As a result, the image data transfer can be optimized in accordance with the processing of image data, thereby the image processing efficiency in the image processing apparatus can be increased.

Moreover, the control of the image data transfer can be realized by providing the control register. Therefore, it can be suppressed that the hardware becomes large and the production cost increases due to addition of the function of controlling the image data transfer mode.

Next, control of image data transfer performed between the RAM 409 and the SIMD type arithmetic processing section 401 by the image processing apparatus according to the second embodiment will be described. The image processing apparatus in the second embodiment is constructed such that the control register changes over setting of a random access mode in which an address is set to access the memory, and setting of an automatic access mode in which an address is automatically updated to access the memory, in accordance with a control signal provided from outside.

Figure 9:
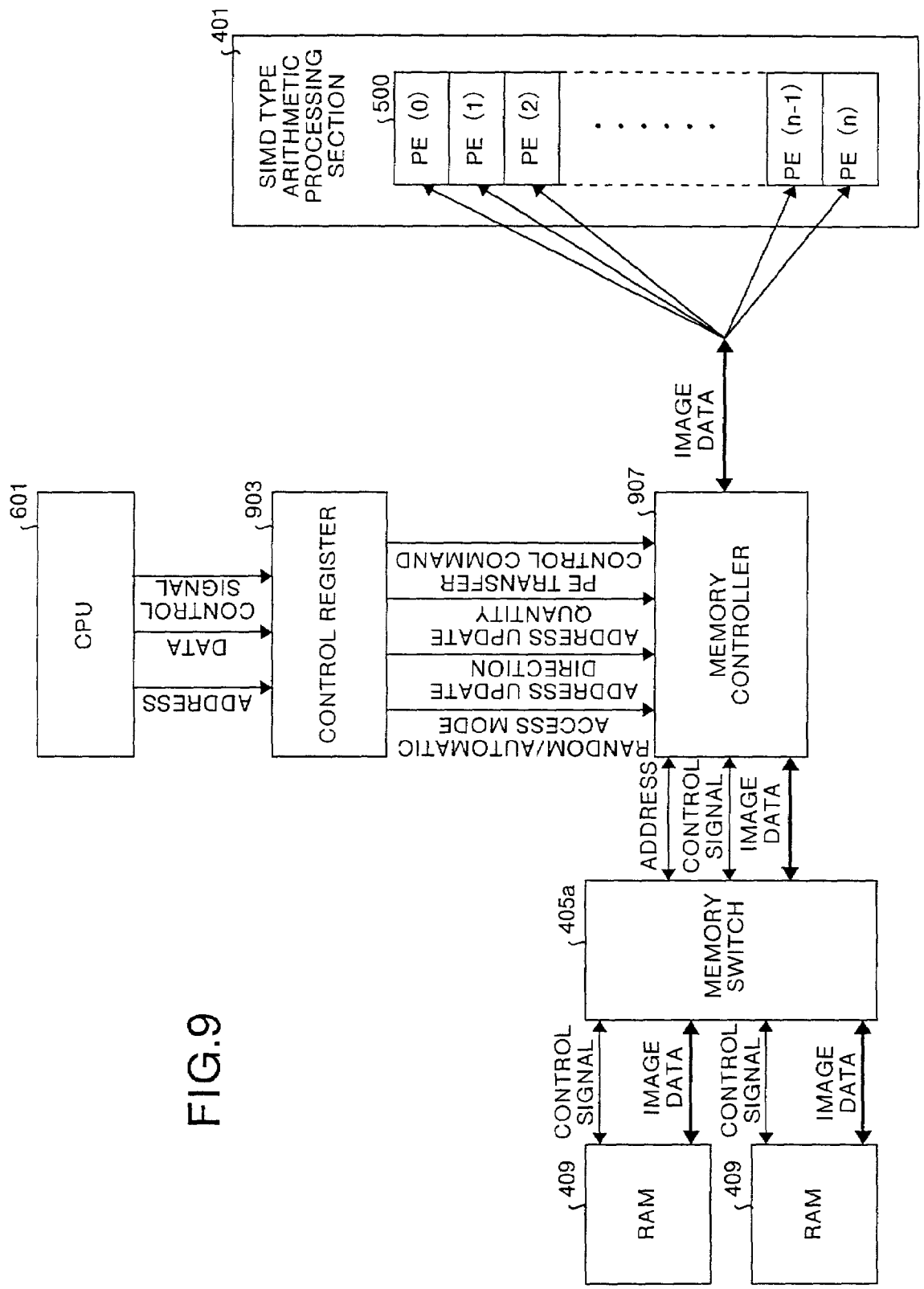
FIG. 9 is a schematic diagram for explaining the image data transfer control in a second embodiment.

FIG. 9 is a schematic diagram for explaining the image data transfer control in the second embodiment. The construction shown in FIG. 9 is similar to the one shown in FIG. 6, except of the construction of the control register and memory controller. Therefore, with regard to the construction shown in FIG. 9, the similar construction to the one shown in FIG. 6 is denoted by the same reference symbol, and the description thereof is omitted.

As shown in FIG. 9, the memory controller 907 in the second embodiment is connected to the control register 903. This control register 903 has the image data transfer mode setting function for setting the image data transfer mode of the RAM 409 connected to the memory controller 907.

To the control register 903 are input an address of a register connected to the RAM 409 to be controlled (in the figure, simply written as address), write data to the RAM 409 (in the figure, simply written as data), and the control signal, from the CPU 601 outside of the image processing processor 204 (for example, in the process controller 211).

The control register 903 comprises, similarly to the control register 603, a register for setting a write address, number of write words, write offset, a final address, a read address, and the number of read words. Moreover, the control register 903 in the second embodiment further has a register for setting the address update method and the address update quantity at the discrimination of the random address mode and the automatic access mode and the automatic access mode.

The control register 903 generates a PE transfer control command of the memory controller 907 and output to the memory controller 907. Moreover, the control register 903 outputs control commands regarding discrimination of the random access mode and the automatic access mode (mentioned as random/automatic access mode), address update direction at the time of automatic access mode (mentioned as address update direction) and update quantity (mentioned as address update quantity), together with the PE transfer control command to the memory controller 907.

The memory controller 907 generates a control signal in response to the control command regarding PE transfer control command, discrimination of the random access mode and the automatic access mode, address update direction at the time of automatic access mode and address update quantity. Then, the memory controller 907 inputs the address required for the operation of the random access mode, together with this control signal, to the RAM 409 via the memory switch 405a. As a result, the RAM 409 transfers the image data (shown by a thick line) to/from the processor element 500 in the SIMD type arithmetic processing section 401, in accordance with the control signal, in the random access mode or the automatic access mode.

The operation of the image data transfer control in the second embodiment in the random access mode or the automatic access mode will now be described.

Random Access Mode:

The random access mode refers to an image data transfer mode for setting an address of the RAM 409 every time accessing the RAM 409. In the second embodiment, the control command regarding discrimination of the random access mode and the automatic access mode is input into the memory controller 907, together with the PE transfer control command from the control register 903.

The memory controller 907 discriminates which of the random access mode or the automatic access mode is shown by this command. If the command shows the random access mode, the memory controller 907 outputs the address set in the write address or read address, in accordance with the operation of write and read, together with the control signal, to the memory switch 405a.

At the time of read operation, the memory controller 907 accesses the RAM 409 specified by this address, and reads out the image data stored in the RAM 409. The read-out image data is transferred to the processor element 500.

On the other hand, at the time of write operation, the memory controller 907 starts the writing operation from the processor element 500 which is set so as to write first by the write offset, and transfers the image data sequentially to the RAM 409. Therefore, it is necessary for the CPU 601 to set the address of the RAM 409 in the register of the control register 903 every time of accessing.

Automatic Access Mode:

The automatic access mode refers to an image data transfer mode wherein at the time of accessing the RAM 409, only the address of the RAM 409 to be first accessed is set, and then, processing of accessing the RAM 409 is repeated, while automatically updating the address.

When the input command shows the random access mode, the memory controller 907 outputs the address set in the write address or read address, in accordance with the operation of write and read, together with the control signal, to the memory switch 405a.

At the time of read operation, the memory controller 907 repeats processing of accessing the RAM 409 sequentially from the RAM 409 specified by this address (initial address), and transfers the read-out image data to the processor element 500. At the time of repeating this processing, the address of the RAM 409 to be accessed is automatically updated. The update of the address is performed based on the command showing the address update direction and the address update quantity input from the control register 903 to the memory controller 907.

That is to say, the memory controller 907 repeats the processing of accessing the RAM 409, while updating the address by the quantity set by the address update quantity in the direction set by the address update direction (in the direction in which the numerical value of the address increases or decreases), sequentially from the RAM 409 having the initial address. This is repeated by the number set as the number of read words.

On the other hand, at the time of write operation, the memory controller 907 repeats processing of accessing the processor element 500 sequentially from the processor element 500 specified by the write offset, and transfers the image data processed by each processor element 500 to the RAM 409. At the time of repeating this processing, the address of the processor element 500 to be accessed is automatically updated. The address update is performed based on the command showing the address update direction and address update quantity, input from the control register 903 to the memory controller 907.

That is to say, the memory controller 907 repeats the processing of accessing the processor element 500, while updating the address by the quantity set by the address update quantity in the direction set by the address update direction, sequentially from the processor element 500 specified by the write offset. This is repeated by the number set as the number of write words.

Figure 10:
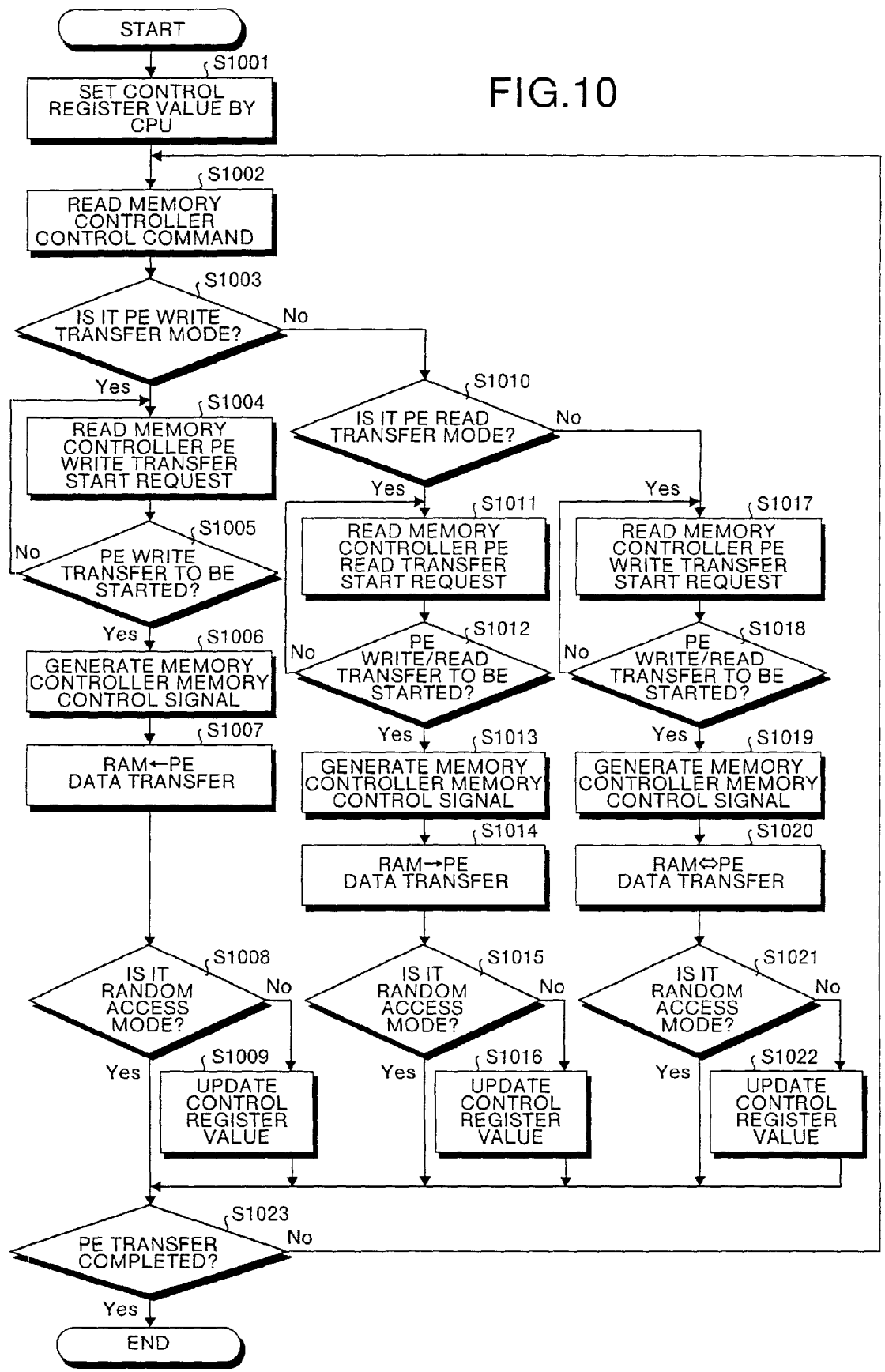
FIG. 10 is a flowchart for explaining the image data transfer control in the second embodiment.

The processing in the second embodiment will now be described. FIG. 10 shows this processing. The CPU 601 sets the control register value in the register of the control register 903 (step S1001). Corresponding to this control register value, the PE transfer control command and a control command regarding the random access mode and the automatic access mode are input from the control register 903 to the memory controller 907. The memory controller 907 reads the PE transfer control command (step S1002), and judges if the PE write transfer mode has been set or not (step S1003).

If it is judged in step S1003 that the PE transfer control command is of the PE write transfer mode (YES in step S1003), the PE write transfer start request is read (step S1004), and it is judged whether the PE write transfer is to be started or not (step S1005). If the PE write transfer is not to be started (NO in step S1005), the flow stands by until the PE write transfer is to be started.

On the other hand, if the PE write transfer is to be started (YES in step S1005), the memory controller B 407b generates a control signal (step S1006), and inputs the signal to the processor element 500. Due to this control signal, the processor element 500 accesses the RAM 409 and image data transfer from the processor element 500 to the RAM 409 is set (S1007).

Moreover in the second embodiment, it is judged whether the image data transfer in step S1007 has been made in the random access mode or not (step S1008) As a result of this judgment, if the image data has not been transferred in the random access mode, that is, when the image data has been transferred in the automatic access mode (NO in step S1008) the control register value is updated for the next image data transfer (step S1009). This update is performed in the direction set by the address update direction, by the quantity set by the address update quantity.

After the completion of the above-described processing, or in step S1008, if image data transfer has been performed in the random access mode (YES in step S1008), it is judged whether the image data transfer has been completed or not (step S1023). As a result of this judgment, if the transfer has not been completed (NO in step S1023), the flow returns to the processing for reading the control signal from the memory controller B 407b (step S1002). If the transfer has been completed (YES in step S1023), the image data transfer control processing is completed.

Moreover, if it is judged in step S1003 that the PE transfer control command is not of the PE write transfer mode (NO in step S1003), it is judged whether the PE transfer control command is of the PE read transfer mode or not (step S1010). If it is judged in the judgment in step S1010 that the PE transfer control command is of the PE read transfer mode (YES in step S1010), the PE read transfer start request is read (step S1011), and it is judged if the PE read transfer is to be started or not (step S1012). If the PE read transfer is not to be started (NO in step S1012), the flow stands by until the PE read transfer is to be started.

On the other hand, if the PE read transfer is to be started (YES in step S1012), the memory controller 907 generates a control signal (step S1013), and inputs the signal to the RAM 409. Due to this signal, the image data stored in the RAM 409 is read, and transferred to the processor element 500 (step S1014).

Moreover, in the second embodiment, it is judged whether the image data transfer in step S1014 has been made in the random access mode or not (step S1015). If it is judged that the image data has been transferred in the automatic access mode (NO in step S1015), the control register value is updated for the next image data transfer, in the direction set by the address update direction, by the quantity set by the address update quantity (step S1016).

After the completion of the above-described processing, or in step S1014, if image data transfer has been performed in the random access mode (YES in step S1015), it is judged whether the image data transfer has been completed or not (step S1023). As a result of this judgment, if the transfer has not been completed (NO in step S1023), the flow returns to the processing for reading the control signal from the memory controller 407 (step S1002). If the transfer has been completed (YES in step S1023), the image data transfer control processing is completed.

Moreover, if it is judged in step S1010 that the PE transfer control command is not of the PE read transfer mode (NO in step S1010), it is judged that the PE transfer control command is of the PE write/read transfer mode. Then, the PE write/read transfer start request is read (step S1017) and it is judged whether the PE write/read transfer is to be started or not (step S1018).

If the PE write/read transfer is not to be started (NO in step S1018), the flow stands by until the PE write/read transfer is to be started. On the other hand, if the PE write/read transfer is to be started (YES in step S1018), the memory controller B 407b generates a control signal (step S1019), and inputs the control signal to the processor element 500. Due to this control signal, image data transfer in the PE write/read transfer mode is performed between the RAM 409 and the processor element 500 (S1020).

Moreover, in the second embodiment, it is judged if the image data transfer in step S1020 has been made in the random access mode or not (step S1021). As a result of this judgment, if the image data has been transferred in the automatic access mode (NO in step S1021), the control register value is updated for the next image data transfer, in the direction set by the address update direction, by the quantity set by the address update quantity (step S1022)

After the completion of the above-described processing, or in step S1020, if image data transfer has been performed in the random access mode (YES in step S1021), it is judged whether the image data transfer has been completed or not (step S1023). As a result of this judgment, if the transfer has not been completed (NO in step S1023), the flow returns again to the processing for reading the control signal from the memory controller 407 (step S1002). If the transfer has been completed (YES in step S1023), the image data transfer control processing is completed.

As described above, according to the second embodiment, at the time of image data transfer between the RAM 409 and the SIMD type arithmetic processing section 401, either of the random access mode or the automatic access mode can be selected. As a result, the freedom in setting the image data transfer that can be selected according to the image processing increases, enabling further improvement in the efficiency of the image processing.

Next, control of image data transfer performed between the RAM 409 and the SIMD type arithmetic processing section 401 by the image processing apparatus according to the third embodiment will be described. The image processing apparatus in the third embodiment is for setting a redundant readout mode, wherein the control register reads image data redundantly from the RAM 409, in accordance with a control signal provided from outside, and transfers data to the SIMD type arithmetic processing section 401.

Figure 11:
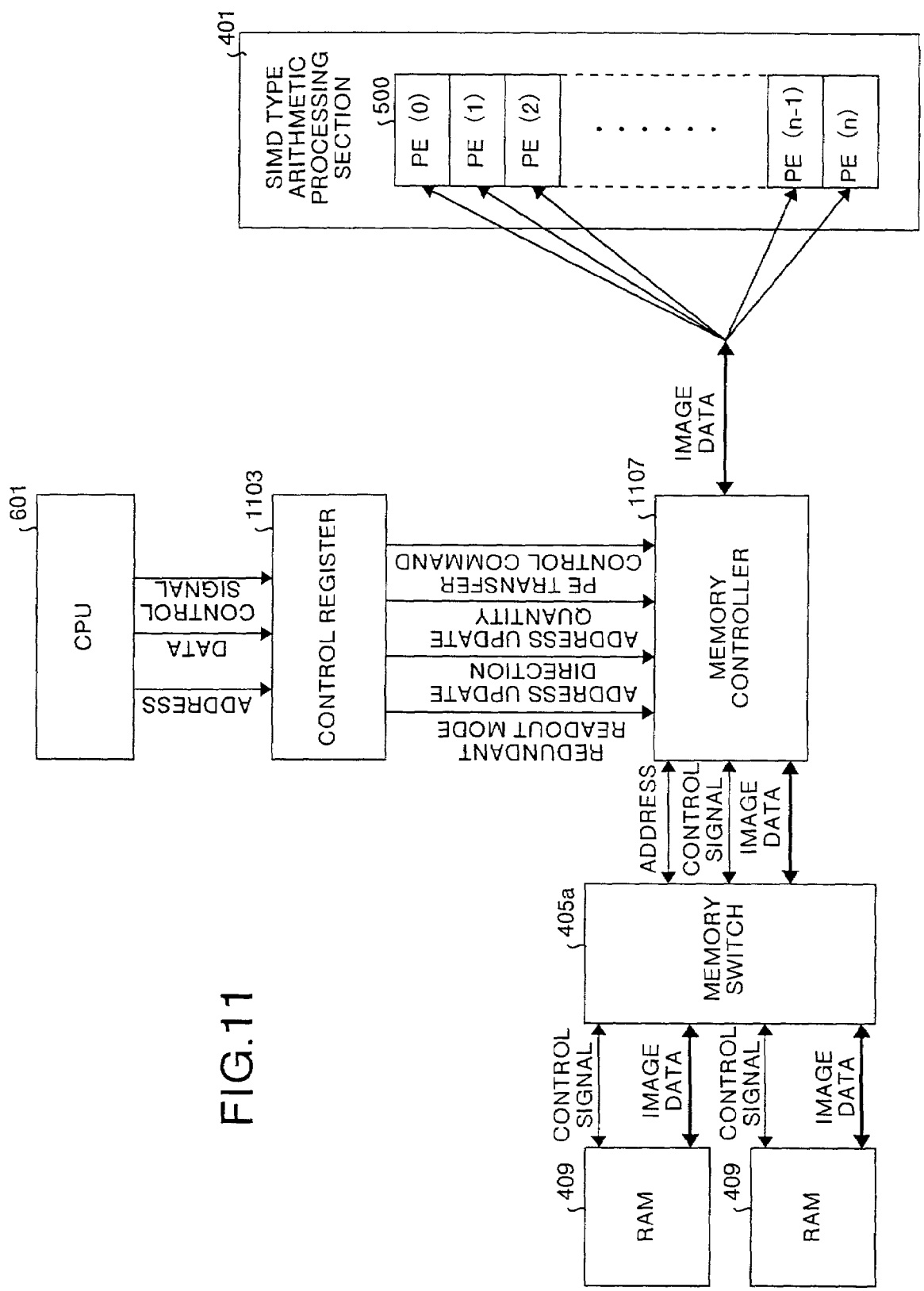
FIG. 11 is a schematic diagram for explaining the image data transfer control in a third embodiment.

FIG. 11 is a schematic diagram for explaining the image data transfer control according to the third embodiment. The construction shown in FIG. 11 is similar to the one shown in FIG. 6 and FIG. 9, except of the construction of the control register and memory controller. Therefore, with regard to the construction shown in FIG. 11, the similar construction to the one shown in FIG. 6 and FIG. 9 is denoted by the same reference symbol, and the description thereof is omitted.

As shown in FIG. 11, the memory controller 1107 in the third embodiment is connected to the control register 1103. The control register 1103 comprises, similarly to the control register 603, a register for setting a write address, number of write words, write offset, a final address, a read address, and the number of read words. Moreover, the control register 1103 in the third embodiment has a register for setting a redundant readout mode, and the address update direction and the address update quantity at the time of redundant readout.

The control register 1103 generates a PE transfer control command for the memory controller 1107 and outputs the control command to the memory controller 1107. Moreover, the control register 1103 outputs control commands regarding the redundant readout mode, and address update direction at the time of redundant readout (mentioned as address update direction) and update quantity (mentioned as address update quantity), together with the PE transfer control command to the memory controller 1107. Moreover, a redundant readout control signal instructing the timing of redundant readout is input into the memory controller 1107 from outside (for example, from a process controller 211).

The memory controller 1107 generates a control signal in response to the control commands regarding the PE transfer control command and the redundant readout mode, and the address update direction and address update quantity of the redundant readout. Then the memory controller 1107 inputs the address necessary for the redundant readout operation, together with the control signal, to the RAM 409 via the memory switch 405a. As a result, the RAM 409 transfers the image data (shown by a thick line) to/from the processor element 500 in the SIMD type arithmetic processing section 401, in accordance with the control signal, in the random access mode or the automatic access mode.

Figure 12:
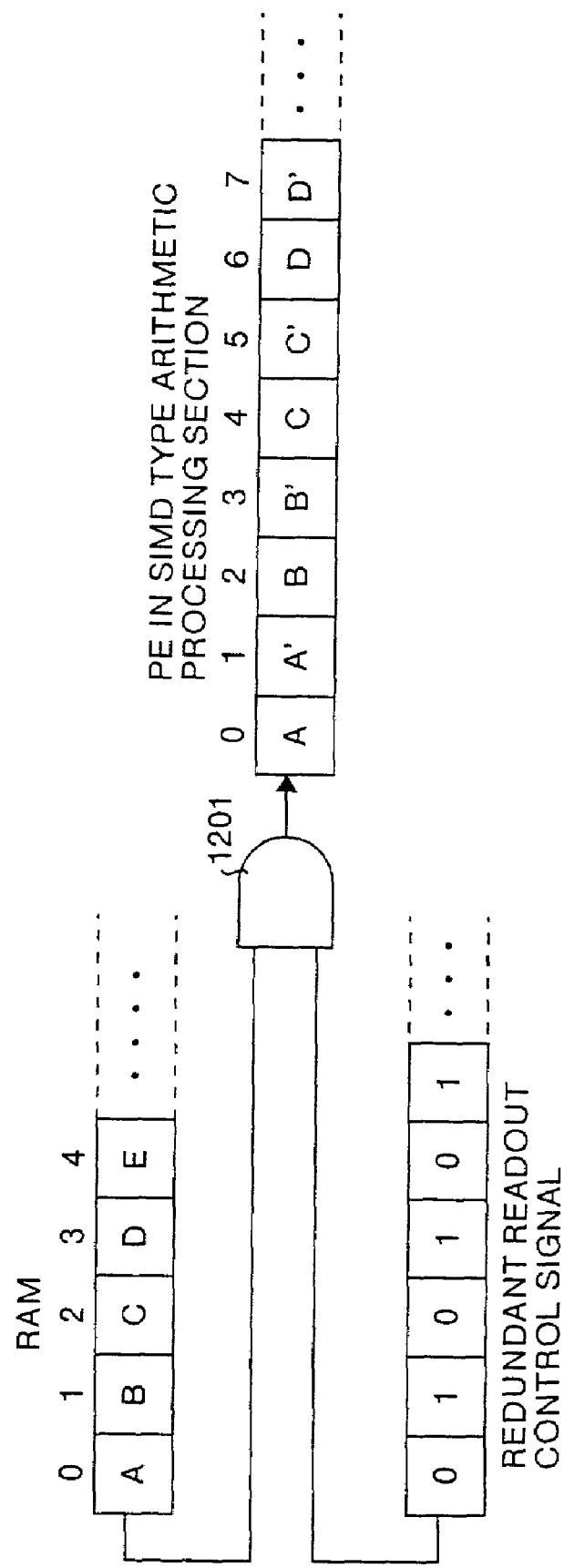
FIG. 12 is a diagram for specifically explaining the image data transfer control in the third embodiment.

The operation of the image data transfer control in the third embodiment in the redundant readout mode will be described. FIG. 12 is a diagram for explaining the operation for the redundant readout in more detail. In FIG. 12, each RAM 409 connected to the SIMD type arithmetic processing section 401 is shown, discriminated as 0, 1, 2, 3, . . . . In RAM0, RAM1, RAM2, RAM3, image data A, image data B, image data C, image data D and image data E are respectively stored.

Moreover, each of the processor element 500 within the SIMD type arithmetic processing section 401 is denoted, discriminated as 0, 1, 2, 3, . . . . In addition, a redundant readout control signal provided to each of the discriminated processor element is denoted, discriminated as "0" and "1". Here, "0" shows that redundant readout is not performed, and "1" shows that redundant readout is performed.

If the processor element 0 accesses the RAM0 to read out the image data, at the time of this readout, the first readout control signal "0" is output to the logic circuit 1201. At this time, the address of the RAM0 to be accessed is also input into the logic circuit 1201 together with the readout control signal. The logic circuit 1201 outputs the address of RAM0 and a signal "0" to the processor element 0.

The processor element 0 accesses the RAM0 in accordance with the input address to read out image data A. At this time, due to the signal "0", redundant readout is not performed, and image data A stored in the RAM0 is transferred to the processor element 0 (written as "A" in the processor element 0).

Then, the address of RAM1 and the redundant readout control signal "1" are input into the logic circuit 1201. At this time, the logic circuit 1201 does not update the address of RAM in response to the redundant readout control signal "1". Therefore, the processor element 1 again accesses the RAM0 that has been accessed before, and reads out the image data A stored in the RAM0. As a result, the image data stored in the RAM0 is transferred to both of the processor element 0 and the processor element 1 (the image data A transferred to the processor element 1 side is shown as image data A').

In this manner, the processor element 0, 1, 2, 3 . . . sequentially access the RAM0, RAM1, RAM2, RAM3 . . . , and read out the image data stored in the RAM to thereby transfer the image data to the processor element. When such processing is performed in accordance with the redundant readout control signal shown in the figure, image data A, image data A', image data B, image data B', image data C, image data C', image data D and image data D' are transferred to the processor element in the SIMD type arithmetic processing section 401 in this order.

The mark of image data X (X is an optional number) shows the image data stored in the RAM X, and the mark of image data X' shows image data stored in the RAM X, which is transferred in the redundant readout mode.

The processing in the third embodiment will now be described, using a flowchart in FIG. 13. The flowchart in FIG. 13 is for explaining the processing performed when the image data transfer mode is either of the PE read transfer mode or the PE write/read transfer mode.

Figure 13:
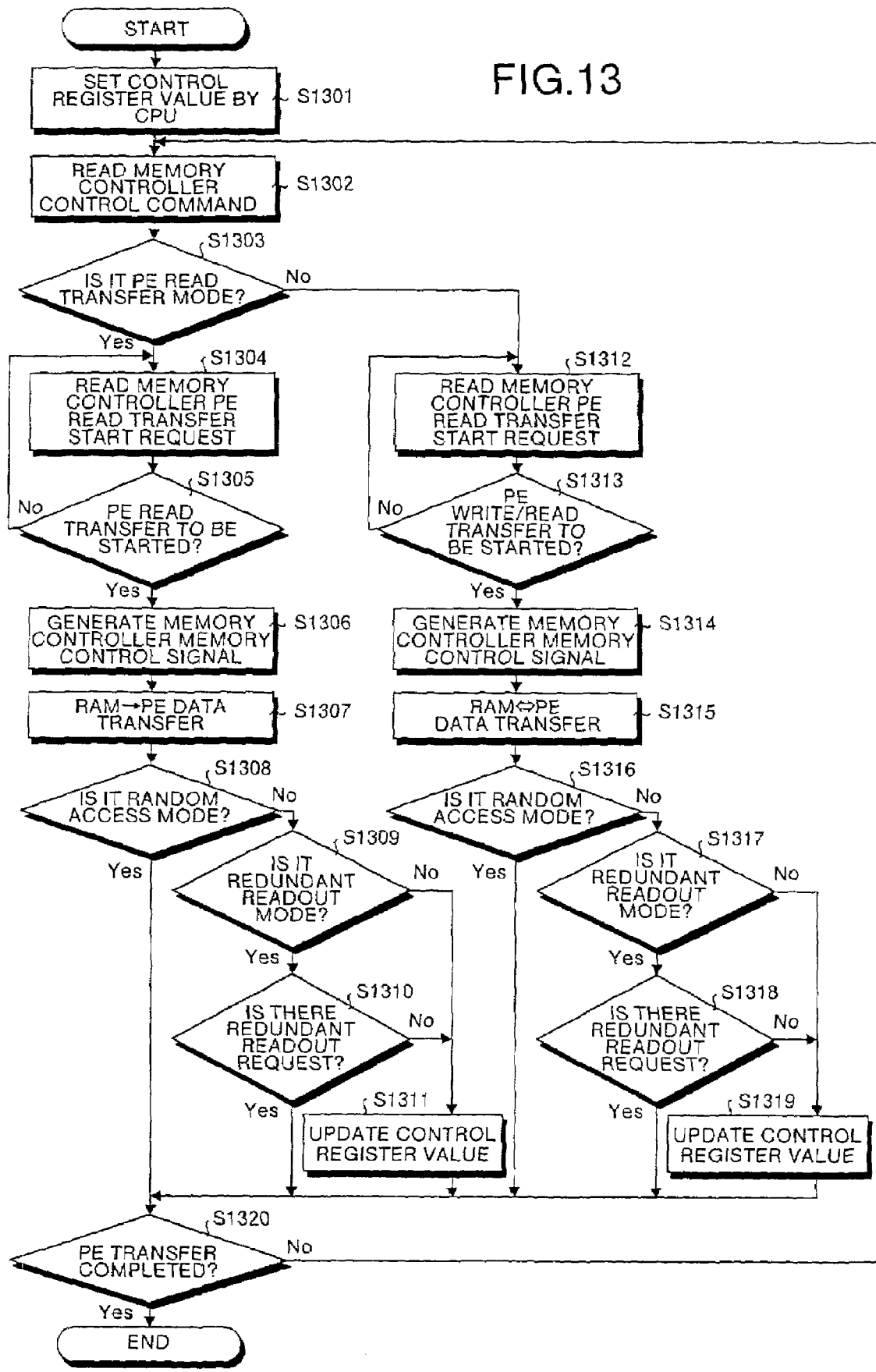
FIG. 13 is a flowchart for explaining the image data transfer control in the third embodiment.

As shown in FIG. 13, the CPU 601 sets a control register value in a register of the control register 1103 (step S1301) The control register 1103 inputs control commands regarding the PE transfer control command, random access mode, automatic access mode and redundant readout mode to the memory controller 1103 in accordance with the control register value.

The memory controller 1107 reads such control commands (step S1302), and judges whether the PE transfer control mode shows the read transfer mode or not from the PE transfer control command (step S1303).

If it is judged in step S1303 that the PE transfer control command is of the PE read transfer mode (YES in step S1303), the memory controller 1107 reads the PE read transfer start request (step S1304), and then judges whether to start PE read transfer or not (step S1305). If the PE read transfer is not started (NO in step S1305), the flow stands by until the PE read transfer is to be started.

On the other hand, if PE read transfer is to be started (YES in step S1305), the memory controller B 407b generates a control signal (step S1306) and inputs this control signal to the RAM 409. By this control signal, the image data stored in the RAM 409 is read out and transferred to the processor element 500 (S1307).

Then, the memory controller 1107 judges whether the image data transfer carried out in step S1307 has been made in the random access mode or not (step S1308). If it is judged that the image data has been transferred in the automatic access mode (NO in step S1308), it is judged whether this access has been made in the redundant readout mode or not (step S1309).

If the redundant readout mode has not been set (NO in step S1309), the control register value set in the control register 1103 is updated in the direction set by the address update direction, by a quantity set by the address update quantity (step S1311).

Moreover, as a result of the judgment in step S1309, if the redundant read out mode has been set (YES in step S1309), it is judged whether the redundant readout request has been made or not (step S1310). This judgment of existence of the redundant readout request is performed by the existence of an input of a redundant readout control signal.

If there is no redundant readout request (NO in step S1310), the control register value set in the control register 1103 is updated (step S1311). After the above-described processing, or if there is a redundant readout request (YES in step S1310), it is judged whether the image data transfer has been completed or not (step S1320).

As a result of this judgment, if transfer has not been completed (NO in step S1320), the flow returns to the processing for reading the control signal from the memory controller B 407*b* (step S1302). If the transfer has been completed (YES in step S1320), the image data transfer control processing is completed.

Moreover, if it is judged in step S1303 that the PE transfer control command is not of the PE read transfer mode (NO in step S1303), it is judged that the PE transfer control command is of the PE write/read transfer mode. Then, the PE write/read transfer start request is read (step S1312) and it is judged whether the PE write/read transfer is to be started or not (step S1313). As a result, if the PE write/read transfer is not to be started (NO in step S1313), the flow stands by until the PE write/read transfer is started (step S1312).

On the other hand, if the PE write/read transfer is to be started (YES in step S1313), the memory controller B 407*b* generates a control signal (step S1314), and inputs the control signal to the processor element 500. Due to this control signal, the processor element 500 accesses the RAM 409 and the image data is transferred to the RAM 409 (S1315).

Then, the memory controller 1107 judges if the image data transfer in step S1315 has been made in the random access mode or not (step S1316). Then, if it is judged that the image data has been transferred in the automatic access mode (NO in step S1316), it is judged if this access is made in the redundant readout mode or not (step S1317). If the redundant readout has not been set (NO in step S1317), the control register value set in the control register 1103 is updated (step S1319).

Moreover, if the redundant readout mode has been set, as a result of judgment in step S1317 (YES in step S1317), it is judged whether the redundant readout request has been made or not, according to the existence of the redundant readout control signal (step S1318). If the redundant readout mode has not been set (NO in step S1318), the control register value set in the control register 1103 is updated in the direction set by the address update direction, by the quantity set by the address update quantity (step S1319)

After the above-described processing, or if there is the redundant readout request (YES in step S1318), it is judged if the image data transfer has been completed or not (step S1320). As a result of this judgment, if the transfer has not been completed, (NO in step S1320), the flow returns to the processing for reading the control signal from the memory controller B 407*b* (step S1302). If the transfer has been completed (YES in step S1320), the image data transfer control processing is completed.

According to the third embodiment, when the processor element set so as to continuously access the RAM 409 processes the same image data, the image data stored in the same RAM 409 is to be processed. Therefore, it is not necessary to provide a plurality of RAM 409 for storing the same image data, thereby the number of RAM 409 in the image processing apparatus can be suppressed.

Next, control of image data transfer performed between the RAM 409 and the SIMD type arithmetic processing section 401 by the image processing apparatus according to the fourth embodiment will be described. The image processing apparatus in the fourth embodiment is for setting a thinning-out readout mode, wherein the control register reads image data from the SIMD type arithmetic processing section 401 by thinning out the image data, in accordance with a control signal provided from outside, and transfers data to the RAM 409.

Figure 14:
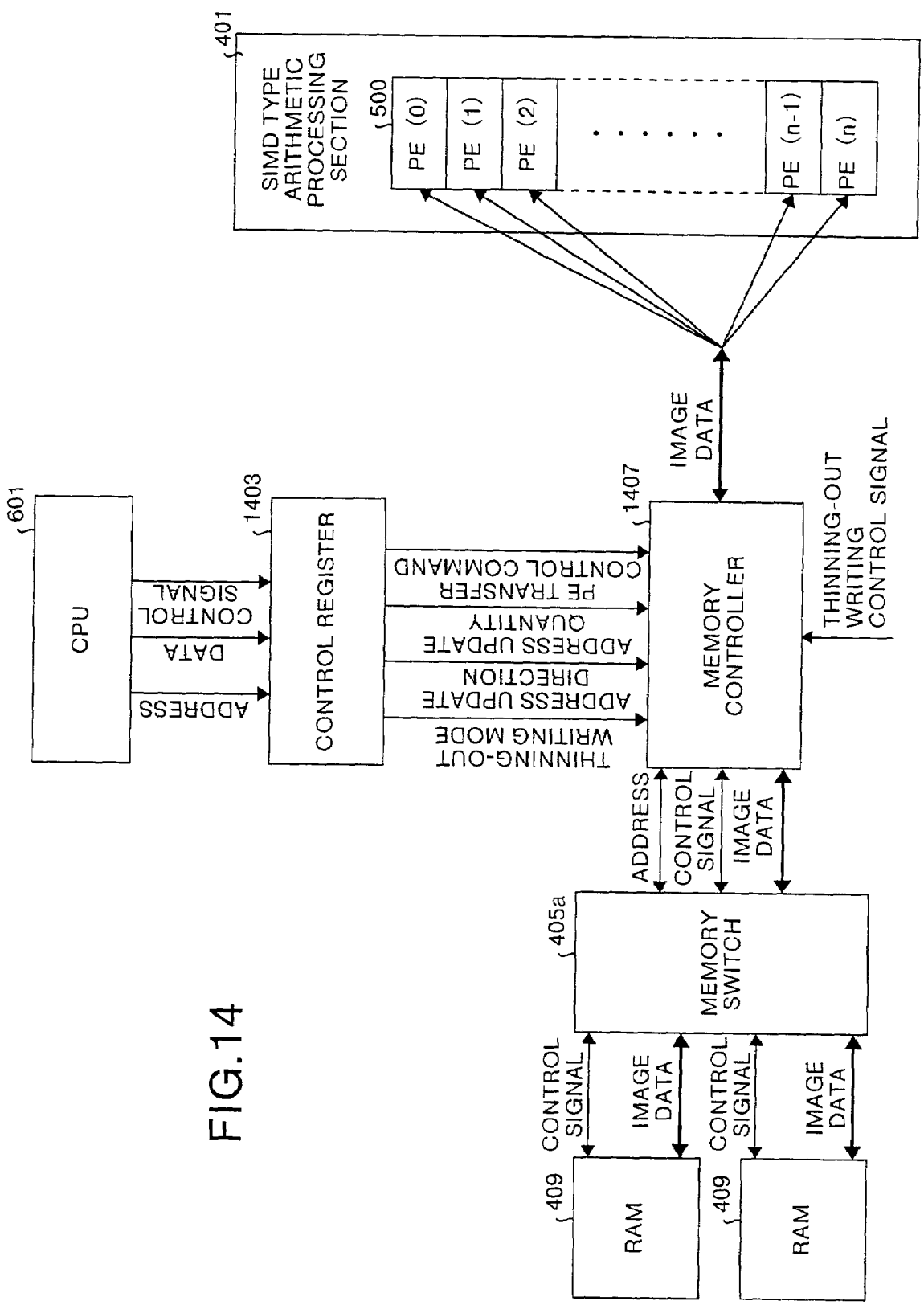
FIG. 14 is a schematic diagram for explaining the image data transfer control in a fourth embodiment.

FIG. 14 is a schematic diagram for explaining the image data transfer control according to the fourth embodiment. The construction shown in FIG. 14 is similar to the one shown in FIG. 6, FIG. 9 and FIG. 11, except of the construction of the control register and memory controller. Therefore, with regard to the construction shown in FIG. 14, the similar construction to the one shown in FIG. 6, FIG. 9 and FIG. 11 is denoted by the same reference symbol, and the description thereof is omitted.

As shown in FIG. 14, the memory controller 1407 in the fourth embodiment is connected to the control register 1403. The control register 1403 comprises, similarly to the control register 603, a register for setting a write address, number of write words, write offset, a final address, a read address, and the number of read words. Moreover, the control register 1403 in the fourth embodiment has a register for setting a thinning-out writing mode, and the address update direction and the address update quantity at the time of thinning-out writing.

The control register 1403 generates a PE transfer control command for the memory controller 1407 and outputs the control command to the memory controller 1407. Moreover, the control register 1403 outputs control commands regarding the thinning-out writing mode, and address update direction at the time of thinning-out writing (mentioned as address update direction) and update quantity (mentioned as address update quantity), together with the PE transfer control command to the memory controller 1407. Moreover, a thinning-out writing control signal instructing the timing of thinning-out writing is input into the memory controller 1407 from outside (for example, from a process controller 211).

The memory controller 1407 generates a control signal in response to the control commands regarding the PE transfer control command and the thinning-out writing mode, and the address update direction and address update quantity of the thinning-out writing. Then the memory controller 1407 inputs the address necessary for the thinning-out writing operation, together with the control signal, to the RAM 409 via the memory switch 405*a*. As a result, the RAM 409 transfers the image data (shown by a thick line) to/from the processor element 500 in the SIMD type arithmetic processing section 401 in accordance with the control signal, in the thinning-out writing mode.

Figure 15:
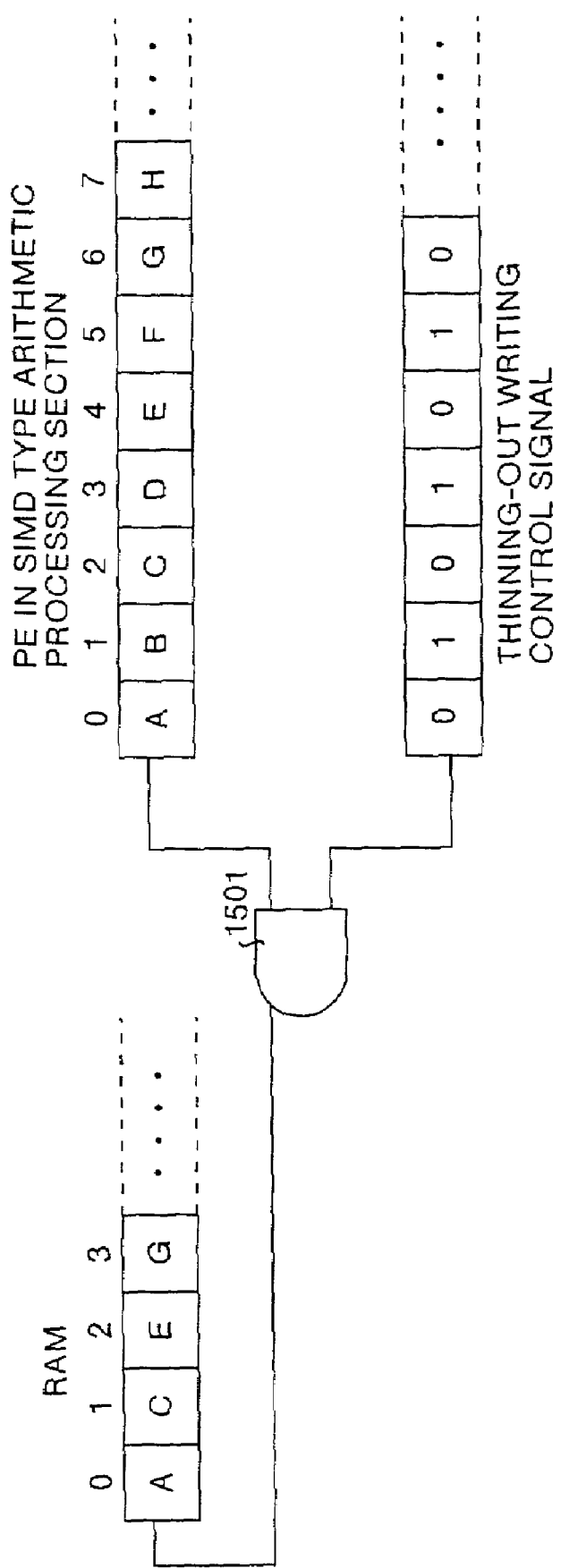
FIG. 15 is a diagram for specifically explaining the image data transfer control in the fourth embodiment.

The operation of the image data transfer control in the fourth embodiment in the thinning-out writing mode will now be described. FIG. 15 is a diagram for explaining the operation for the thinning-out writing in more detail. In FIG. 15, each RAM 409 connected to the SIMD type arithmetic processing section 401 is shown, discriminated as 0, 1, 2, 3, . . . .

Moreover, each of the processor element 500 within the SIMD type arithmetic processing section 401 is denoted, discriminated as 0, 1, 2, 3, . . . . In FIG. 15, with the processor element 500 denoted by 0, 1, 2, 3, . . . , each of image data A, image data B, image data C, image data D, image data E, image data F, image data G and image data H is respectively processed.

Moreover, the thinning-out writing control signal given to each discriminated processor element is shown by being discriminated as "0" and "1". This "0" shows that thinning-out writing is not performed, and "1" shows that thinning-out writing is performed.

If the processor element 0 accesses the RAM 409 to transfer and write the image data, at the time of this transfer, the address of the processor element 0 (or may be one expressed as the number 0) is output to the logic circuit 1501. Also, the first thinning-out writing control signal "0" is output to the logic circuit 1501 together. The logic circuit 1501 outputs the address of processor element 0 and a thinning-out writing signal "0" to the RAM0.

The image data A is transferred to the RAM0, by means of the access of the processor element 0 corresponding to the input address. At this time, due to the signal "0", thinning-out writing is not performed, and the transferred image data A is written in the RAM0 (written as "A" in the RAM0 shown in FIG. 15).

Then, the address of processor element 1 and the thinning-out writing control signal "1" are input into the logic circuit 1501. At this time, the logic circuit 1501 does not perform transfer of image data B of the processor element 1 in response to the thinning-out writing control signal "1". Therefore, image data B in the processor element 1 is thinned out without being written in any RAM.

Next, the address of processor element 2 and the thinning-out writing control signal "0" are input into the logic circuit 1501. At this time, since the thinning-out writing control signal is "0", the image data C in the processor element 2 is transferred to the RAM1.

In this manner, the processor elements sequentially access the RAM, and transfer the processed image data. When such processing is performed in accordance with the thinning-out writing control signal shown in the figure, image data A, image data C, image data E and image data G are written in the RAM0, RAM1, RAM2 and RAM3.

The processing in the fourth embodiment will now be described. The flowchart in FIG. 16 is for explaining the processing performed when the image data transfer mode is either of the PE write transfer mode or the PE write/read transfer mode.

Figure 16:
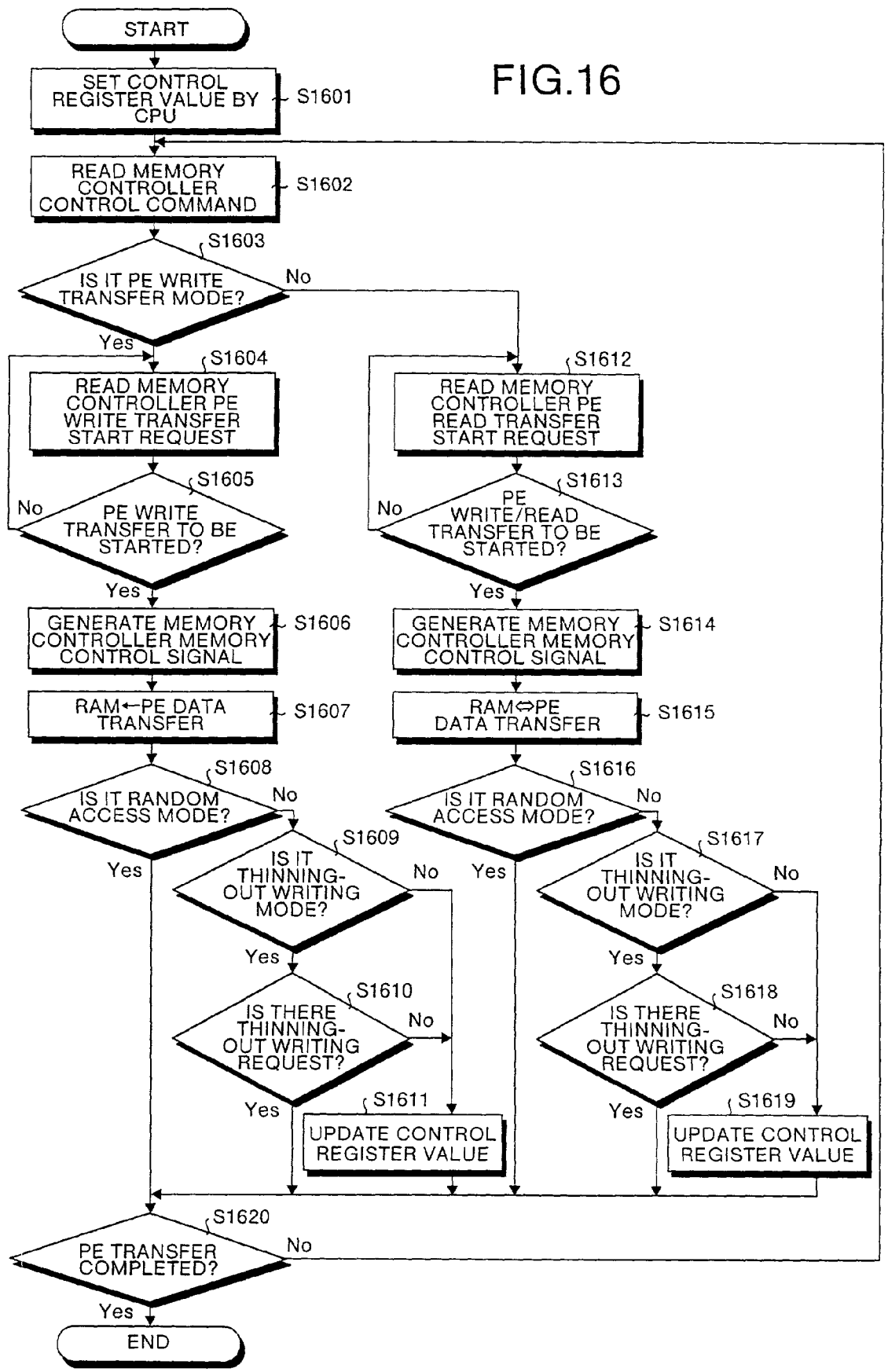
FIG. 16 is a flowchart for explaining the image data transfer control in the fourth embodiment.

As shown in FIG. 16, the CPU 601 sets a control register value in a register of the control register 1403 (step S1601). The control register 1403 inputs control commands regarding the PE transfer control command, random access mode, automatic access mode and thinning-out writing mode to the memory controller 1103 in accordance with the control register value.

The memory controller 1407 reads the PE transfer control command among such control commands (step S1602) and judges whether the PE transfer control command shows the write transfer mode or not (step S1603).

If it is judged in step S1603 that the PE transfer control command is of the PE write transfer mode (YES in step S1603), the memory controller 1407 reads the PE write transfer start request (step S1604), and then judges whether to start PE write transfer or not (step S1605). If the PE write transfer is not started (NO in step S1605), the flow stands by until the PE write transfer is to be started.

On the other hand, if the PE write transfer is to be started (YES in step S1605), the memory controller B 407b generates a control signal (step S1606) and inputs this control signal to the processor element 500. By this control signal, the processor element 500 accesses the RAM 409 to thereby transfer the image data to the RAM 409 (S1607).

Then, the memory controller 1407 judges whether the image data transfer carried out in step S1607 has been made in the random access mode or not (step S1608). If it is judged that the image data has been transferred in the automatic access mode in step S1608 (NO in step S1608), it is judged whether this access has been made in the thinning-out writing mode or not (step S1609).

As a result of this judgment, if the thinning-out writing mode has not been set (NO in step S1609), the control register value set in the control register 1403 is updated (step S1611). This update is performed in the direction set by the address update direction, by a quantity set by the address update quantity.

Moreover, as a result of the judgment in step S1609, if the thinning-out writing mode has been set (YES in step S1609), it is judged whether the thinning-out writing request has been made or not (step S1610). This judgment of existence of the thinning-out writing request is performed by the existence of an input of a thinning-out writing control signal.

If there is no thinning-out writing request (NO in step S1610), the control register value is updated (step S1611). After the above-described processing, or if there is a thinning-out writing request (YES in step S1610), it is judged whether the image data transfer has been completed or not (step S1620).

As a result of this judgment, if transfer has not been completed (NO in step S1620), the flow returns to the processing for reading the control signal from the memory controller B 407b (step S1602). If the transfer has been completed (YES in step S1620), the image data transfer control processing is completed.

Moreover, if it is judged in step S1603 that the PE transfer control command is not of the PE write transfer mode (NO in step S1603), it is judged that the PE transfer control command is of the PE write/read transfer mode. Then, the PE write/read transfer start request is read (step S1612) and it is judged whether the PE write/read transfer is to be started or not (step S1613). As a result, if the PE write/read transfer is not to be started (NO in step S1613) the flow stands by until the PE write/read transfer is started (step S1612).

On the other hand, if the PE write/read transfer is to be started (YES in step S1613), the memory controller B 407b generates a control signal (step S1614), and inputs the control signal to the processor element 500. Due to this control signal, the processor element 500 accesses the RAM 409 and the image data is transferred to the RAM 409 (S1615).

Then, the memory controller 1407 judges if the image data transfer in step S1615 has been made in the random access mode or not (step S1616). Then, if it is judged that the image data has been transferred in the automatic access mode in step S1618 (NO in step S1616), it is judged if this access is made in the thinning-out writing mode or not (step S1617). As a result of this judgment, if the thinning-out writing has not been set (NO in step S1617), the control register value is updated (step S1619).

Moreover, if the thinning-out writing mode has been set, as a result of judgment in step S1617 (YES in step S1617) it is judged whether the thinning-out writing request has been made or not in this access, according to the existence of the thinning-out writing control signal (step S1618).

If there is no thinning-out writing request (NO in step S1618), the control register value set in the control register 1403 is updated (step S1619). After the above-described processing, or if there is the thinning-out writing request (YES in step S1618), it is judged if the image data transfer has been completed or not (step S1620).

As a result of this judgment, if the transfer has not been completed (NO in step S1620), the flow returns to the processing for reading the control signal from the memory controller B 407b (step S1602). If the transfer has been completed (YES in step S1620), the image data transfer control processing is completed.

According to the fourth embodiment, it can be prevented that the image data that needs not to be written in the RAM 409 is transferred to the RAM 409, and only the image data required for the RAM 409 can be stored. Therefore, the number of RAM 409 comprised in the image processing apparatus can be reduced, or the RAM 409 in the image processing apparatus can be effectively used.

The image processing method described in the embodiments is realized by executing a program prepared in advance on a computer such as a personal computer or a workstation. This program is stored in a computer readable recording medium such as hard disk, floppy disk, CD-ROM, MO or DVD, and executed by being read from the recording medium by the computer. This program can be also distributed via the recording medium, or through network such as Internet as a transmission medium.

As described above, according to one aspect of the invention, such effects can be obtained that write and read operation with respect to the memory is controlled, and write and read processing with respect to the memory is optimized corresponding to the image processing, thereby an image processing apparatus which can perform image processing efficiently can be obtained. Moreover, such effects becomes noticeable particularly in the SIMD type arithmetic processing section, in which the same processing can be performed with respect to a plurality of different image data.

Further, the image processing apparatus of this invention can be realized with a relatively simple construction, and an image processing apparatus which can avoid increase in the production cost due to adding a transfer control function of the image data can be obtained with a relatively simple construction.

Further, an image processing apparatus which can optimize the write and read processing with respect to the memory corresponding to the image processing can be obtained.

Further, when the same image data is processed in the arithmetic processing section which continuously accesses the memory, the number of memories that store the image data can be made minimum. As a result, an image processing apparatus in which the memory may be relatively small, or the memory can be used more efficiently can be obtained.

Further, it is possible that the image data whose processing is not necessary is not transferred to the memory. As a result, an image processing apparatus in which the memory may be relatively small, or the memory can be used more efficiently can be obtained.

According to another aspect of the present invention, the image processing method of this invention can be realized with a relatively simple construction, and an image processing method which can avoid cost increase due to adding a transfer control function of the image data can be obtained with a relatively simple construction.

According to still another aspect of the present invention the recording medium records a program for a computer to execute the method according to any one of the sixth to tenth aspects to thereby make the program machine-readable, thereby the operation according to any one of the sixth to tenth aspects can be realized by a computer.

The present document incorporates by reference the entire contents of Japanese priority documents, 11-375563 filed in Japan on Dec. 28, 1999.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus comprising:
   an image unit configured to provide image data based on a scanned original document;
   a control unit;
   an arithmetic processing unit configured to receive the image data from the image unit, said arithmetic processing unit including,
   a programmable arithmetic processing section configured to provide simultaneous processing of plural image data portions,
   a memory configured with a plurality of addressable memory locations, with each memory location storing image data portions relating to the image data provided by the image unit,
   a control register section configured to receive control inputs directly from said control unit outside of said arithmetic processing unit, said control register section being further configured to provide control register section outputs based on said control inputs, and
   a memory controller section configured to be responsive to the control register section outputs to control selection of one data transfer mode from a plurality of data transfer modes available to provide different data transfer operations between the arithmetic processing unit and the memory to transfer the image data portions stored thereat to said programmable arithmetic processing section depending on said simultaneous processing to be performed to produce simultaneously processed image data, said transfer modes including at least a random access transfer mode in which a memory address must be included to access the memory for said data transfer and at least one other data transfer mode; and
   an image writing unit arranged to receive and use said simultaneously processed image data to write a second document as a reproduction of said scanned original document.

2. The image processing apparatus according to claim 1, wherein said at least one other data transfer mode an automatic access mode in which an address is automatically updated to access the memory.

3. The image processing apparatus according to claim 1, wherein said at least one other data transfer mode is a redundant transfer mode in which data is transferred redundantly from a single addressable memory location of said memory to a plurality of processing elements in said arithmetic processing section.

4. The image processing apparatus to claim 1, wherein said at least one other data transfer mode is a transfer mode in which data provided from the arithmetic processing section is thinned out to transfer to said memory.

5. An image processing apparatus comprising:
   means for providing image data based on a scanned original document control means; and an arithmetic processing means for receiving the image data from the means for providing image data, said arithmetic processing means including, programmable arithmetic processing means for simultaneous processing plural image data portions, memory means having a plurality of addressable memory locations, with each memory location storing image data portions relating to the image data provided by the means for providing image data, control register means for receiving control inputs directly from said control means external to said arithmetic processing means, said control register means further processing said control inputs to provide control register means outputs, and memory controller means for controlling selection of one data transfer mode responsive to said control register means outputs, said selection of one data transfer mode being made from a plurality of data transfer modes available to provide different data transfer operations between the arithmetic processing means and the memory for transferring the image data portions stored thereat to said programmable arithmetic processing means depending on said simultaneous processing to be performed to produce simultaneously processed image data, said transfer modes including at least a random access transfer mode in which a memory address must be included to access the memory for said data transfer and at least one other data transfer mode; and image writing means for receiving and using said simultaneously processed image data to write a second document as a reproduction of said scanned original document.

6. The image processing apparatus according to claim 5, wherein said at least one other data transfer mode an automatic access mode in which an address is automatically updated to access the memory means.

7. The image processing apparatus according to claim 5, wherein said at least one other data transfer mode is a redundant transfer mode in which data is transferred redundantly from a single addressable memory location of said memory to a plurality of processing elements in said arithmetic processing means.

8. The image processing apparatus according to claim 5, wherein said at least one other data transfer mode is a transfer mode in which data provided from the arithmetic processing means is thinned out prior to transfer to said memory means.

9. An image processing method executed by an image processing apparatus, said image processing apparatus including a programmable arithmetic image processing section for simultaneous processing a plurality of image data portions, each image data portion being digital signals prepared based on a scanned document image, and a memory having a plurality of addressable memory locations accessible by a memory controller section to provide image data stored at said plurality of addressable memory locations as image data portions related to the scanned document image to said arithmetic processing section as said plurality of image data portions for simultaneously processing, the method comprising steps of:

receiving data representing said scanned document image;

receiving control inputs directly from a control unit at a control register section, said control unit being external to said arithmetic image processing section;

processing said control inputs at said control register section to provide control register section outputs to the memory controller section;

controlling selection of a transfer mode from a plurality of transfer modes available to provide different data transfer operations between the arithmetic processing unit and the memory to transfer the image data portions stored in the memory to said programmable arithmetic processing section depending on said simultaneous processing to be performed to produce simultaneously processed image data, said transfer modes including at least a random access transfer mode in which a memory address must be included to access the memory for said data transfer and at least one other data transfer mode, said selection being performed by using said memory controller section under control of said control register section outputs; and receiving and using said simultaneously processed image data to write a second document as a reproduction of said scanned original document.

10. The image processing method according to claim 9, wherein said at least one other data transfer mode an automatic access mode in which an address is automatically updated to access the memory.

11. The image processing method according to claim 9, wherein said at least one other data transfer mode is a redundant readout transfer mode for transferring the redundantly read data portions from a single address of the memory to a plurality of processing elements in said arithmetic processing section.

12. The image processing method according to claim 9, wherein said at least one other data transfer mode is a transfer mode in which data provided from the arithmetic processing section is thinned out prior to transfer to said addressable memory locations in said memory.

13. A computer readable medium for storing instructions, which when executed by a computer, causes the computer to perform an image processing method executed by an image processing apparatus, said image processing apparatus including a programmable arithmetic image processing section for simultaneous processing a plurality of image data portions, each image data portion being digital signals prepared based on a scanned document image, and a memory having a plurality of addressable memory locations accessible by a memory controller section to provide image data stored at said plurality of addressable memory locations as image data portions related to the scanned document image to said arithmetic processing section as said plurality of image data portions for simultaneously processing, the method comprising steps of:

receiving data representing said scanned document image;

receiving control inputs directly from a control unit at a control register section, said control unit being external to said arithmetic image processing section;

processing said control inputs at said control register section to provide control register section outputs to said memory controller section; controlling selection of a transfer mode from a plurality of transfer modes available to provide different data transfer operations between the arithmetic processing unit and the memory, said transfer modes including at least a random access transfer mode in which a memory address must be included to access the memory for said data transfer and at least one other data transfer mode to transfer the image data portions stored in the memory to said programmable arithmetic processing section depending on said simultaneous processing to be performed to produce simultaneously processed image data, said selection being performed by using said memory controller section under control of said control register section outputs; and receiving and using said simultaneously processed image data to write a second document as a reproduction of said scanned original document.

14. The image processing apparatus according to claim 1, further comprising an image data control unit arranged to expand an image area of said image data.

15. The image processing apparatus according to claim 14, wherein said image data control unit is arranged to scale said image data.

16. The image processing apparatus according to claim 14, wherein said image data control unit is arranged to synthesize a plurality of sets of image data.

17. The image processing apparatus according to claim 16, wherein at least one of said plurality of sets of image data is communicated to said image processing apparatus from another apparatus.

* * * * *